(12) United States Patent
Miyauchi et al.

(10) Patent No.: US 8,325,567 B2
(45) Date of Patent: Dec. 4, 2012

(54) THERMALLY-ASSISTED MAGNETIC RECORDING HEAD COMPRISING NEAR-FIELD LIGHT GENERATOR

(75) Inventors: Daisuke Miyauchi, Tokyo (JP); Tsutomu Chou, Tokyo (JP); Kosuke Tanaka, Tokyo (JP); Susumu Aoki, Tokyo (JP); Tetsuya Roppongi, Tokyo (JP); Katsuki Kurihara, Tokyo (JP)

(73) Assignee: TDK Corporation, Tokyo (JP)

( * ) Notice: Subject to any disclaimer, the term of this patent is extended or adjusted under 35 U.S.C. 154(b) by 268 days.

(21) Appl. No.: 12/557,078

(22) Filed: Sep. 10, 2009

(65) Prior Publication Data

US 2011/0058272 A1  Mar. 10, 2011

(51) Int. Cl.
  G11B 11/00  (2006.01)
(52) U.S. Cl. .................................. 369/13.33; 369/13.13
(58) Field of Classification Search ..................... 360/59; 369/13.13, 13.33, 13.32, 13.02, 112.09, 112.14, 369/112.21, 112.27; 385/129, 31, 88–94; 250/201.3, 201.5
See application file for complete search history.

(56) References Cited

U.S. PATENT DOCUMENTS

| | | | |
|---|---|---|---|
| 6,649,894 B2 | 11/2003 | Matsumoto et al. | |
| 6,768,556 B1 | 7/2004 | Matsumoto et al. | |
| 7,330,404 B2 | 2/2008 | Peng et al. | |
| 7,454,095 B2 | 11/2008 | Baehr-Jones et al. | |
| 2007/0139818 A1 | 6/2007 | Shimazawa et al. | |
| 2010/0103553 A1* | 4/2010 | Shimazawa et al. ....... | 339/13.33 |
| 2010/0149930 A1* | 6/2010 | Komura et al. ............ | 369/13.33 |
| 2010/0172220 A1* | 7/2010 | Komura et al. ............ | 369/13.33 |
| 2010/0238580 A1* | 9/2010 | Shimazawa et al. ....... | 369/13.33 |
| 2011/0002199 A1* | 1/2011 | Takayama et al. ......... | 369/13.24 |
| 2011/0026377 A1* | 2/2011 | Shimazawa et al. ....... | 369/13.24 |
| 2011/0038236 A1* | 2/2011 | Mizuno et al. ............. | 369/13.24 |
| 2011/0090587 A1* | 4/2011 | Chou et al. ................. | 369/13.33 |
| 2011/0116349 A1* | 5/2011 | Komura et al. ............ | 369/13.33 |
| 2011/0149426 A1* | 6/2011 | Araki et al. ................ | 369/13.33 |
| 2012/0120780 A1* | 5/2012 | Komura et al. ............ | 369/13.33 |
| 2012/0120781 A1* | 5/2012 | Komura et al. ............ | 369/13.33 |

FOREIGN PATENT DOCUMENTS

JP  2004-273021  9/2004

OTHER PUBLICATIONS

Michael Hochberg, et al. "Integrated plasmon and dielectric waveguides" Optics Express, vol. 12, No. 22, Nov. 2004, pp. 5481-5486.
U.S. Appl. No. 12/260,639, Koji Shimazawa, et al., filed Oct. 29, 2008.

* cited by examiner

Primary Examiner — Tan X Dinh
(74) Attorney, Agent, or Firm — Frommer Lawrence & Haug LLP

(57) ABSTRACT

Provided is a thermally-assisted magnetic recording head capable of setting the near-field light (NFL-) emission point to be sufficiently close to the write-field-generating portion. The head comprises a magnetic pole, a waveguide propagating light, and a NFL-generator coupled with the light in surface plasmon mode. The NFL-generator comprises a propagation edge extending to the NFL-generating end surface, at least a portion of the propagation edge being opposed to the waveguide with a distance, and the magnetic pole has a surface contact with a surface portion of the NFL-generator including no propagation edge. Therefore, the distance between the magnetic-pole end surface and the NFL-generating end surface becomes zero. The propagation edge is not contacted with the magnetic pole. Accordingly, the surface plasmon can propagate along on the propagation edge without being absorbed by the pole. Thus, the NFL-emission point is ensured to be at the end point of the propagation edge.

20 Claims, 14 Drawing Sheets

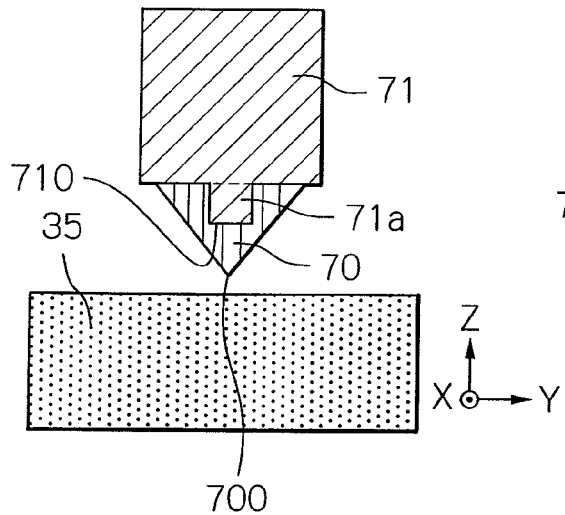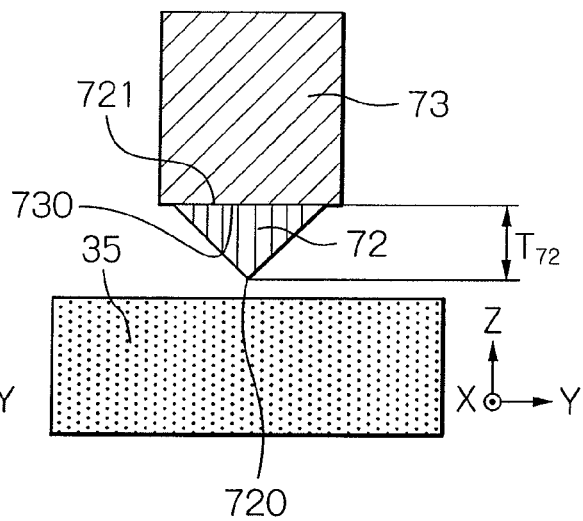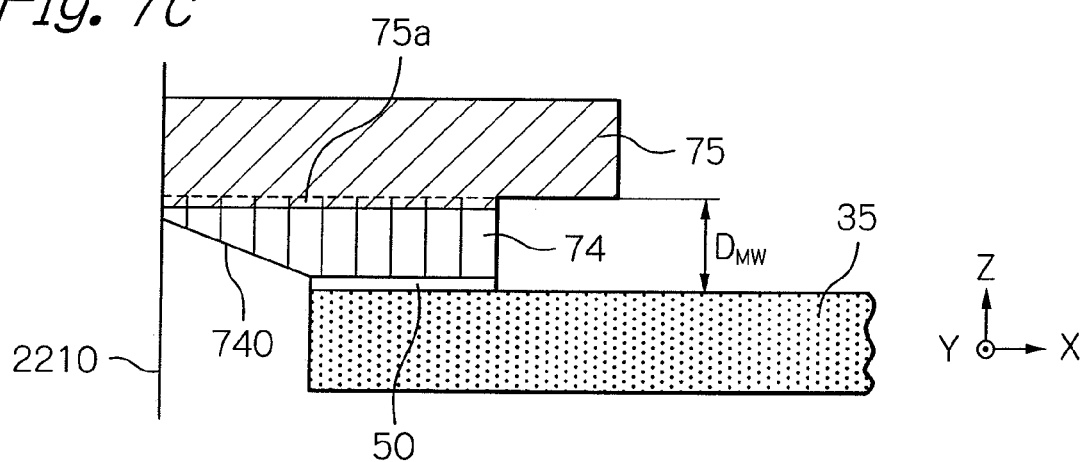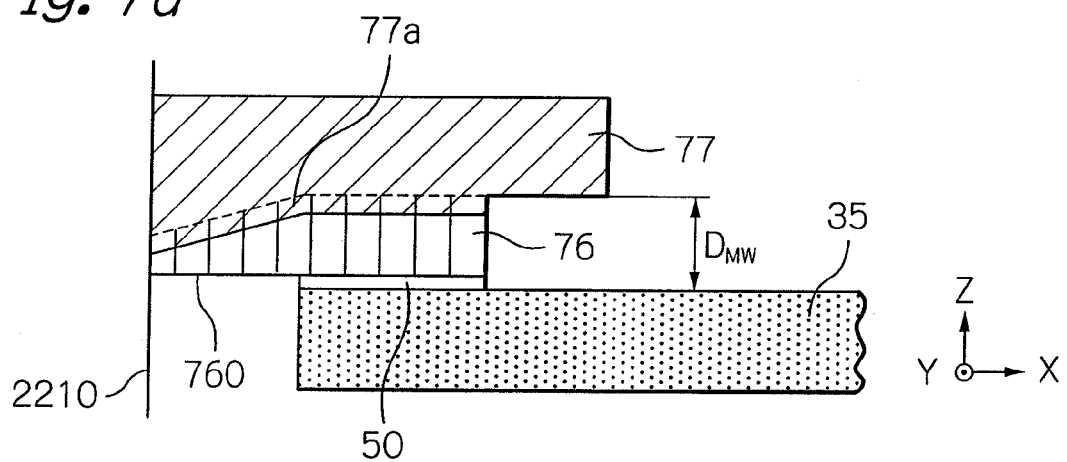

THERMALLY-ASSISTED MAGNETIC RECORDING HEAD COMPRISING NEAR-FIELD LIGHT GENERATOR

BACKGROUND OF THE INVENTION

1. Field of the Invention

The present invention relates to a head used for thermally-assisted magnetic recording in which a magnetic recording medium is irradiated with near-field light (NF-light), thereby anisotropic magnetic field of the medium is lowered, thus data can be written. The present invention especially relates to a thermally-assisted magnetic recording head provided with a near-field light generator (NFL-generator) that converts light received from a waveguide into NF-light. Further, the present invention relates to a magnetic recording apparatus provided with the head.

2. Description of the Related Art

As the recording densities of magnetic recording apparatuses become higher, as represented by magnetic disk apparatuses, further improvement has been required in the performance of thin-film magnetic heads and magnetic recording media. In the magnetic recording media, it is especially necessary to decrease the size of magnetic grains that constitute a magnetic recording layer of the medium and to reduce irregularity in the boundary of record bit in order to improve the recording density. However, the decrease in size of the magnetic grains raises a problem of degradation in thermal stability of the magnetization due to the decrease in volume. As a measure against the thermal stability problem, it may be possible to increase magnetic anisotropy energy $K_U$ of the magnetic grains. However, the increase in energy $K_U$ causes the increase in anisotropic magnetic field (coercive force) of the magnetic recording medium. As a result, the head cannot write data to the magnetic recording medium when the anisotropic magnetic field (coercive force) of the medium exceeds the write field limit.

Recently, as a method for solving the problem of thermal stability, so-called a thermally-assisted magnetic recording technique is proposed. In the technique, a magnetic recording medium formed of a magnetic material with a large magnetic anisotropy energy $K_U$ is used so as to stabilize the magnetization; anisotropic magnetic field of the medium is reduced by applying heat to a portion of the medium where data is to be written; just after that, writing is performed by applying write magnetic field (write field) to the heated portion.

In the thermally-assisted magnetic recording, a technique is well known, which utilizes a near-field light generator (NFL-generator) as a metal piece that generates near-field light (NF-light) from plasmon excited by irradiated laser light. For example, U.S. Pat. Nos. 6,768,556 and 6,649,894 disclose a technique in which NF-light is generated by irradiating a metal scatterer with light and by matching the frequency of the light with the resonant frequency of plasmon excited in the metal.

As described above, various kinds of thermally-assisted magnetic recording systems with NFL-generators have been proposed. Meanwhile, the present inventors have devised a NFL-generator in which laser light is coupled with the NFL-generator in a surface plasmon mode to cause excited surface plasmon to propagate to the opposed-to-medium surface, thereby providing NF-light, instead of directly applying the laser light to a NFL-generator. The NFL-generator is hereinafter referred to as a surface plasmon generator. In the surface plasmon generator, its temperature does not excessively rise because laser light is not directly applied to the surface plasmon generator. As a result, there can be avoided a situation in which the end of a read head element, which reaches the opposed-to-medium surface, becomes relatively far apart from the magnetic recording medium due to the thermal expansion of the generator, which makes it difficult to properly read servo signals during recording operations. In addition, there can also be avoided a situation in which the light use efficiency of a near-field light generating (NFL-generating) optical system including the NFL-generator is degraded because thermal fluctuation of free electrons increases in the NFL-generator.

Here, the NFL-generating optical system is an optical system that includes a waveguide and a NFL-generator, and the light use efficiency of the NFL-generating optical system is given by $I_{OUT}/I_{IN}(\times 100)$, where $I_{IN}$ is the intensity of laser light incident to the waveguide, and $I_{OUT}$ is the intensity of NF-light emitted from a NFL-generating end of the generator after converting the laser light into surface plasmon in the NFL-generator.

To perform thermal-assisted magnetic recording in practice by using the above-described NFL-generating optical system including the surface plasmon generator, the end surface of the surface plasmon generator is required to be located as close to the end surface of magnetic pole as possible in the opposed-to-medium surface, the magnetic pole generating write field. In particular, the distance between them in the direction along track is preferably set to 100 nm or less. Further, the distance between the emitting position of NF-light on the end surface of the surface plasmon generator and the generating position of write field on the magnetic-pole end surface is required to be set sufficiently small. By satisfying these conditions, there can be obtained a sufficiently large field gradient of write field generated from the magnetic pole in a position on the magnetic recording medium where NF-light is applied.

However, the NFL-generator is provided adjacent to the end portion on the opposed-to-medium surface side of the waveguide to convert the light propagating through the waveguide into NF-light. Here, the waveguide and the magnetic pole is required to be provided sufficiently apart from each other in order to avoid a situation in which the light use efficiency of the NFL-generating optical system is drastically reduced due to the absorption of the light propagating through the waveguide by the magnetic pole formed of a metal. This requirement conflicts with the requirement that the NFL-generator and the magnetic pole should be set as close as possible. Therefore, to resolve the conflict, important is the appropriate configuration and arrangement of the waveguide, the NFL-generator and the magnetic pole. Further, significantly important is the control of the emitting position of NF-light on the end surface of the surface plasmon generator. Thus, it is understood that there exists a significantly important problem that, in order to perform appropriate thermally-assisted magnetic recording, a NFL-generating optical system in which a NFL-generator with an adjusted emitting position can be provided adjacent to the magnetic pole should be realized.

SUMMARY OF THE INVENTION

Some terms used in the specification will be defined before explaining the present invention. In a layered structure or an element structure formed on an element-formation surface of a slider substrate of the magnetic recording head according to the present invention, when viewed from a standard layer or element, a substrate side is defined as "lower" side, and the opposite side as an "upper" side. Further, "X-, Y-and Z-axis directions" are indicated in some figures showing embodiments of the head according to the present invention as needed. Here, Z-axis direction indicates above-described "up-and-low" direction, and +Z direction corresponds to a trailing side and −Z direction to a leading side. And Y-axis direction indicates a track width direction, and X-axis direction indicates a height direction.

Further, a "side surface" of a waveguide provided within the magnetic recording head is defined as an end surface other than the end surfaces perpendicular to the direction in which light propagates within the waveguide (−X direction), out of all the end surfaces surrounding the waveguide. According to the definition, an "upper surface" and a "lower surface" are one of the "side surfaces". The "side surface" is a surface on which the propagating light can be totally reflected within the waveguide corresponding to a core. Further, a "side surface" of a NFL-generator (surface plasmon generator) provided within the magnetic recording head is defined as an end surface other than the NFL-generating end surface of the NFL-generator and the end surface opposed to the NFL-generating end surface. Actually, some of the "side surfaces" include a propagation edge described later as a boundary of them.

According to the present invention, a thermally-assisted magnetic recording head is provided, which comprises:

a magnetic pole for generating write field from its end on an opposed-to-medium surface side;

a waveguide through which a light for exciting surface plasmon propagates; and a NFL-generator provided between the magnetic pole and the waveguide, configured to be coupled with the light in a surface plasmon mode and to emit near-field light (NF-light) from a NFL-generating end surface that forms a portion of the opposed-to-medium surface, the NFL-generator comprising a propagation edge extending to the NFL-generating end surface and being configured to propagate thereon the surface plasmon excited by the light, at least a portion of the propagation edge being opposed to the waveguide with a predetermined distance, and the magnetic pole having a surface contact with a surface portion of the NFL-generator that does not include the propagation edge.

In the thermally-assisted magnetic recording head according to the present invention, since the magnetic pole is in surface contact with the NFL-generator, the distance between the end surface of the magnetic pole that generates write field and the NFL-generating end surface of the NFL-generator is zero. On the other hand, the propagation edge of the NFL-generator is not in contact with the magnetic pole at all. Accordingly, the excited surface plasmon can propagate along on the propagation edge without being absorbed by the magnetic pole. As a result, the NF-light emission point on the NFL-generating end surface of the NFL-generator is located at one of the vertices of the NFL-generating end surface, and is a vertex that corresponds to the end of the propagation edge that is not in contact with the magnetic pole. This can ensure that the NF-light emission point is established in a location sufficiently close to the end surface of the magnetic pole that generates write field.

Further, by using the above-described thermally-assisted magnetic recording head, a write field having a sufficiently large gradient can be applied to a sufficiently heated portion in the magnetic recording layer of a magnetic recording medium. Consequently, a thermally-assisted, stable write operation can be ensured.

Further, in the above-described thermally-assisted magnetic recording head according to the present invention, the magnetic pole preferably has a surface contact with all side surfaces of the NFL-generator that do not have the propagation edge as one of their boundaries. And it is preferable that the magnetic pole covers or one end surface of the magnetic pole overlaps all side edges of the NFL-generator except the propagation edge. Further, the NFL-generator preferably comprises a groove extending to the NFL-generating end surface on a side opposite to the propagation edge, and a portion of the magnetic pole is preferably embedded in the groove. In the case, it is preferable that the groove is substantially V-shaped. This means that the magnetic pole has a very small write-field generating point, thereby to contribute to the achievement of higher recording density. Furthermore, the distance between the write-field generating point and the NFL-generating emission point can be set sufficiently small. In practice, in the case that the bottom of the groove is located at a distance along the track from the propagation edge, the distance on the opposed-to-medium surface between the bottom of the groove and the propagation edge is preferably 30 nm (nanometers) or more, and 100 nm or less.

Further, in the above-described thermally-assisted magnetic recording head according to the present invention, a magnetic shield is preferably provided on a side opposite to the magnetic pole when viewed from the NFL-generator. And a buffering portion having a refractive index lower than that of the waveguide is preferably provided in a region including a sandwiched portion between the waveguide and the propagation edge. Further, the NFL-generator is preferably formed of a silver alloy including at least one element selected from a group consisting of a palladium, gold, copper, ruthenium, rhodium and iridium.

According to the present invention, a head gimbal assembly (HGA) is further provided, which comprises: the above-described thermally-assisted magnetic recording head; and a suspension supporting the thermally-assisted magnetic recording head. Furthermore, according to the present invention, a magnetic recording apparatus is provided, which comprises: the above-described HGA; at least one magnetic recording medium; and a recording circuit configured to control write operations that the thermally-assisted magnetic recording head performs to the at least one magnetic recording medium, the recording circuit further comprising a light-emission control circuit configured to control operations of a light source that generates the light for exciting surface plasmon.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIGS. 7a to 7d show schematic views illustrating various embodiments regarding the NFL-generating optical system and the main magnetic pole according to the present invention;

DESCRIPTION OF THE PREFERRED EMBODIMENTS

Figure 1:
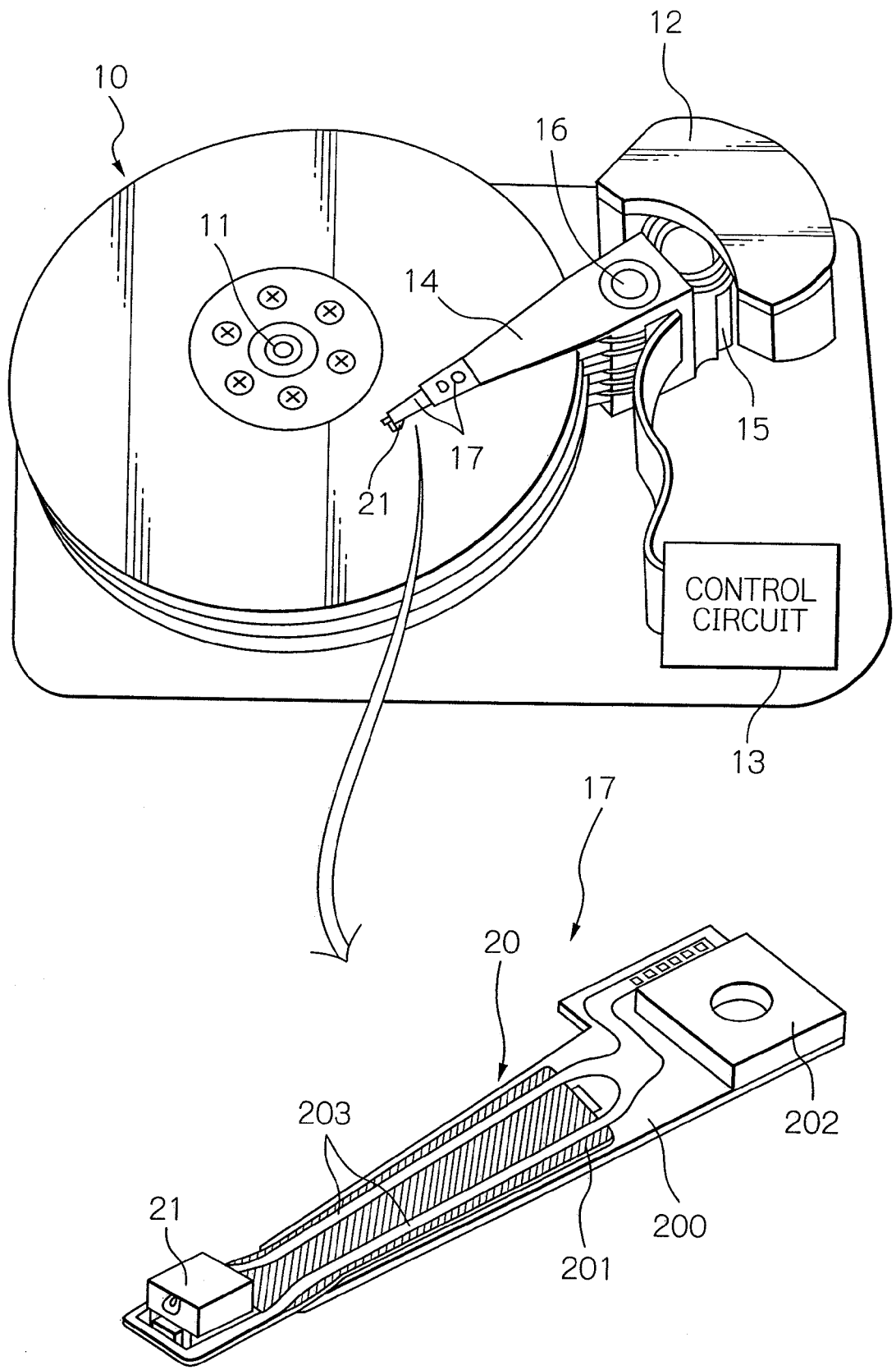
FIG. 1 shows a perspective view schematically illustrating a structure of a major part in one embodiment of a magnetic recording apparatus and an HGA according to the present invention.

FIG. 1 shows a perspective view schematically illustrating a structure of a major part in one embodiment of a magnetic recording apparatus and an HGA according to the present invention. Here, in the perspective view of the HGA, the side of the HGA, which is opposed to the surface of the magnetic recording medium, is presented as the upper side.

A magnetic disk apparatus as a magnetic recording apparatus shown in FIG. 1 includes: a plurality of magnetic disks 10 as magnetic recording media, rotating around a rotational axis of a spindle motor 11; an assembly carriage device 12 provided with a plurality of drive arms 14 therein; a head gimbal assembly (HGA) 17 attached on the top end portion of each drive arm 14 and provided with a thermally-assisted magnetic recording head 21 as a thin-film magnetic head; and a recording/reproducing and light-emission control circuit 13 for controlling write/read operations of the thermally-assisted magnetic recording head 21 and further for controlling the emission operation of a laser diode as a light source that generates laser light used for thermally-assisted magnetic recording, which will be described later.

In the present embodiment, the magnetic disk 10 is designed for perpendicular magnetic recording, and has a structure in which sequentially stacked on a disk substrate is a soft-magnetic under layer, an intermediate layer, and a magnetic recording layer (perpendicular magnetization layer). The assembly carriage device 12 is a device for positioning the thermally-assisted magnetic recording head 21 above a track on which recording bits are aligned, the track being formed on the magnetic recording layer of the magnetic disk 10. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and thermally-assisted magnetic recording heads 21 may be single.

Referring also to FIG. 1, a suspension 20 in the HGA 17 includes a load beam 200, a flexure 201 with elasticity fixed to the load beam 200, and a base plate 202 provided on the base portion of the load beam 200. Further, on the flexure 201, there is provided a wiring member 203 that is made up of lead conductors and connection pads electrically joined to both ends of the lead conductors. The thermally-assisted magnetic recording head 21 is fixed to the flexure 201 at the top end portion of the suspension 20 so as to face the surface of the magnetic disk 10 with a predetermined spacing (flying height). Moreover, one end of the wiring member 203 is electrically connected to terminal electrodes of the thermally-assisted magnetic recording head 21. The structure of the suspension 20 is not limited to the above-described one. An IC chip for driving the head may be mounted midway on the suspension 20, though not shown.

Figure 2:
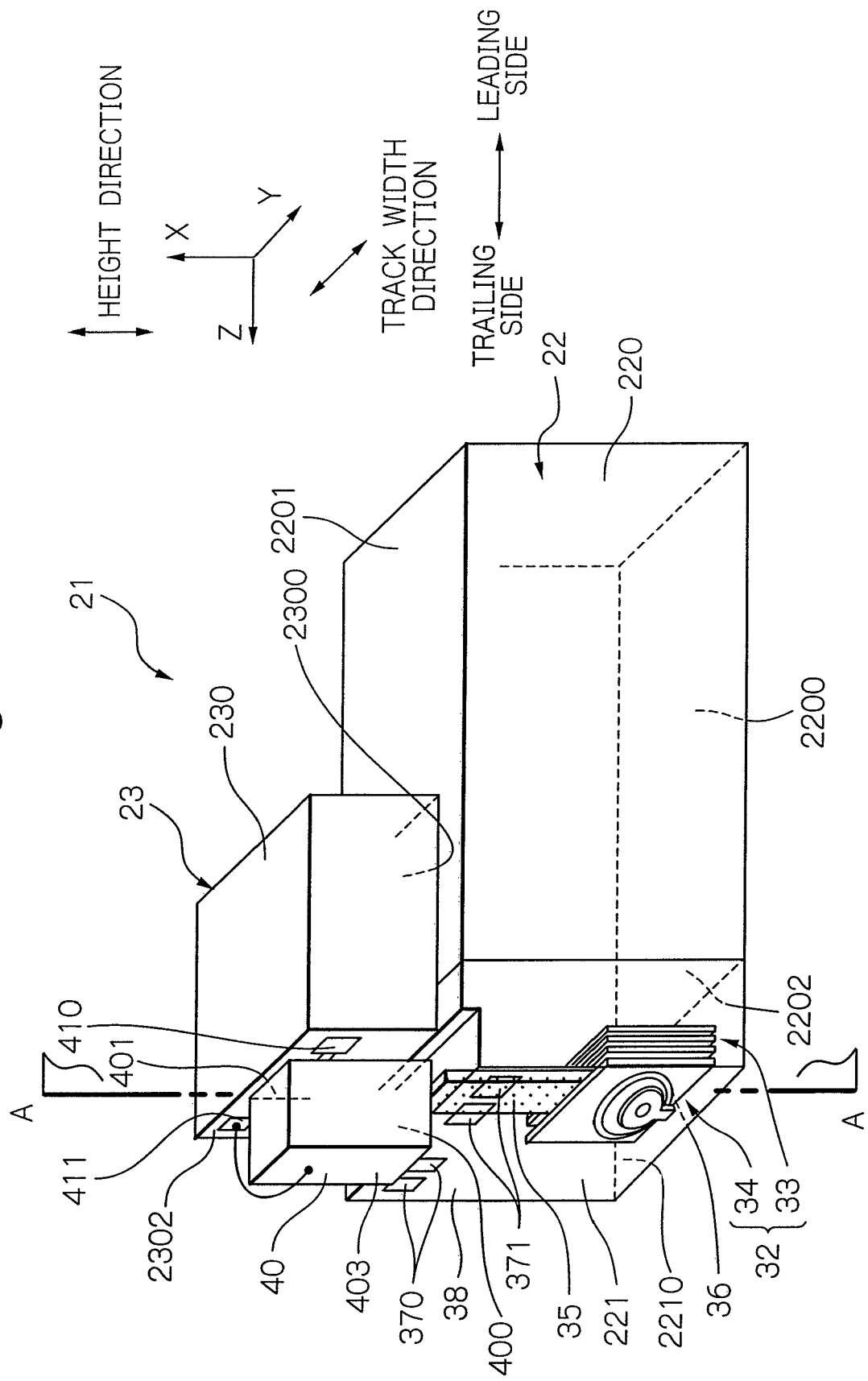
FIG. 2 shows a perspective view illustrating one embodiment of thermally-assisted magnetic recording head according to the present invention.

FIG. 2 shows a perspective view illustrating one embodiment of thermally-assisted magnetic recording head 21 according to the present invention.

As shown in FIG. 2, a thermally-assisted magnetic recording head 21 is constituted of the slider 22 and the light source unit 23. The slider 22 includes: a slider substrate 220 formed of, for example, AlTiC ($Al_2O_3$—TiC), and having an air bearing surface (ABS) 2200 processed so as to provide an appropriate flying height; and a head part 221 formed on an element-formation surface 2202 perpendicular to the ABS 2200. While, the light source unit 23 includes: a unit substrate 230 formed of, for example, AlTiC ($Al_2O_3$—TiC), and having an joining surface 2300; and a laser diode 40 as a light source provided on a source-installation surface 2302 perpendicular to the joining surface 2300. The slider 22 and the light source unit 23 are bonded to each other in such a way that the back surface 2201 of the slider substrate 220 and the joining surface 2300 of the unit substrate 230 have a surface contact with each other. Here, the back surface 2201 of the slider substrate 220 is defined as an end surface opposite to the ABS 2200 of the slider substrate 220. Alternatively, the thermally-assisted magnetic recording head 21 may have a configuration in which the laser diode 40 is provided directly on the slider 22 without using the light source unit 23.

In the slider 22, the head part 221 formed on the element-formation surface 2202 of the slider substrate 220 includes: a head element 32 constituted of a magnetoresistive (MR) element 33 for reading data from the magnetic disk and an electromagnetic transducer 34 for writing data to the magnetic disk; a waveguide 35 for guiding laser light generated from a laser diode 40 provided in the light source unit 23 to the opposed-to-medium surface side; a surface plasmon generator 36, the generator 36 and the waveguide 35 constituting a near-field-light generating (NFL-generating) optical system; an overcoat layer 38 formed on the element-formation surface 2202 in such a way as to cover the MR element 33, the electromagnetic transducer 34, the waveguide 35, and the surface plasmon generator 36; a pair of terminal electrodes 370 exposed in the upper surface of the overcoat layer 38 and electrically connected to the MR element 33; and a pair of terminal electrodes 371 also exposed in the upper surface of the overcoat layer 38 and electrically connected to the electromagnetic transducer 34. The terminal electrodes 370 and 371 are electrically connected to the connection pads of the wiring member 203 provided on the flexure 201 (FIG. 1).

One ends of the MR element 33, the electromagnetic transducer 34 and the surface plasmon generator 36 reach a head part end surface 2210, which is an opposed-to-medium surface of the head part 221. Here, the head part end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk with a predetermined flying height. Thus, the ends of the MR element 33 and electromagnetic transducer 34 face the surface of the magnetic recording layer of the magnetic disk with an appropriate magnetic spacing. Then, the MR element 33 reads data by sensing signal magnetic field from the magnetic recording layer, and the electromagnetic transducer 34 writes data by applying signal magnetic field to the magnetic recording layer. When writing data, laser light generated from the laser diode 40 of the light source unit 23 propagates through the waveguide 35. Then, the propagating laser light is coupled with the surface plasmon generator 36 in a surface plasmon mode, and causes surface plasmon to be excited on the surface plasmon generator 36. The surface plasmon propagates on a propagation edge provided in the surface plasmon generator 36, which will be explained later, toward the head part end surface 2210, which causes near-field light (NF-light) to be generated from the end of the surface plasmon generator 36 on the head part end surface 2210 side. The generated NF-light reaches the surface of the magnetic disk, and heats a portion of the magnetic recording layer of the magnetic disk. As a result, the anisotropic magnetic field (coercive force) of the portion is decreased to a value that enables writing; thus the thermally-assisted magnetic recording can be accomplished by applying write field to the portion with decreased anisotropic magnetic field.

Figure 3:
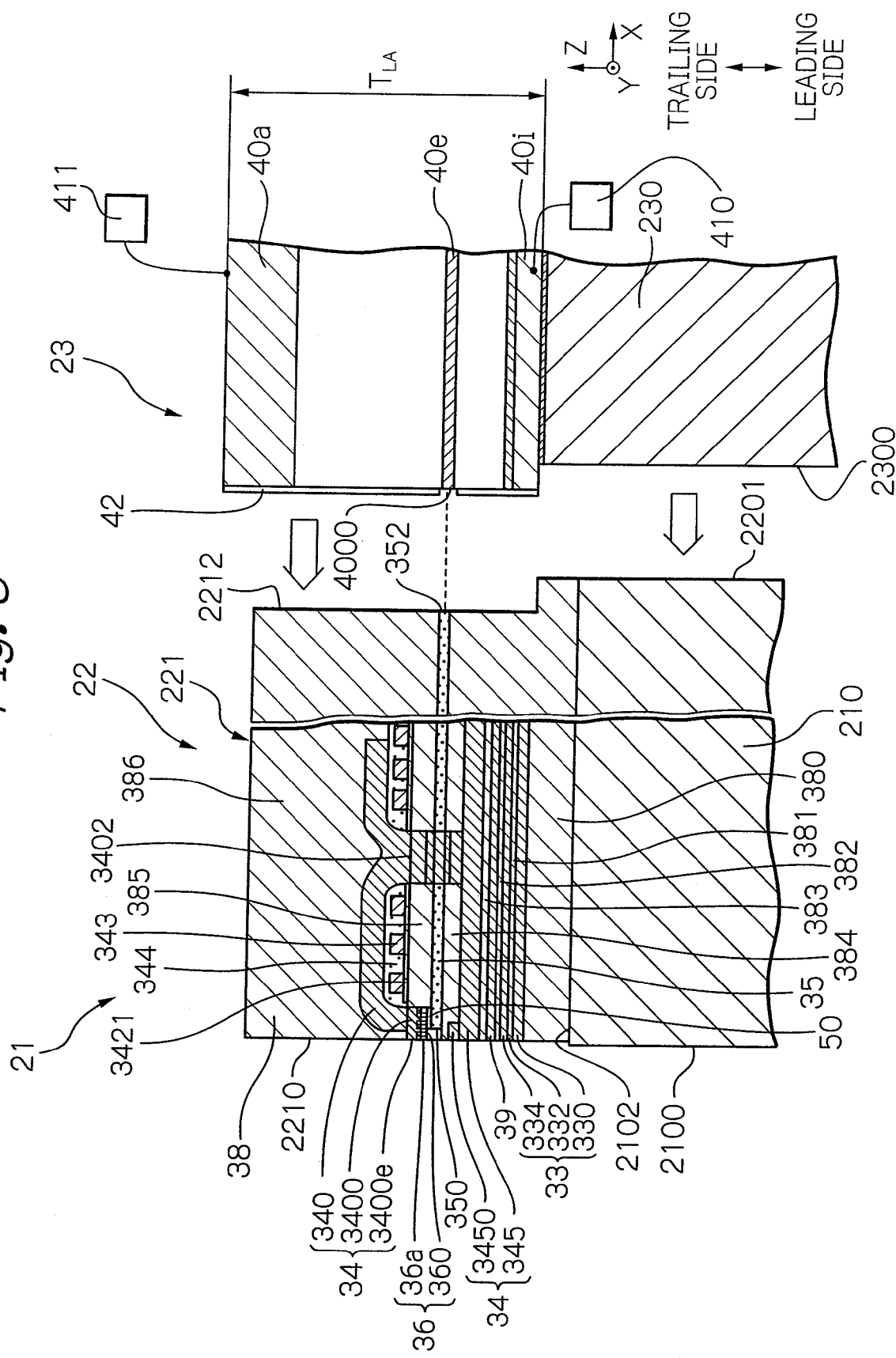
FIG. 3 shows a cross-sectional view taken by plane A in FIG. 2, schematically illustrating the structure of a main part of the thermally-assisted magnetic recording head according to the present invention.

FIG. 3 shows a cross-sectional view taken by plane A in FIG. 2, schematically illustrating the structure of a main part of the thermally-assisted magnetic recording head 21.

As shown in FIG. 3, the MR element 33 is formed on an insulating layer 380 stacked on the element-formation surface 2202, and includes: an MR multilayer 332; and a lower shield layer 330 and an upper shield layer 334 which sandwich the MR multilayer 332 and an insulating layer 381 therebetween. The upper and lower shield layers 334 and 330 prevent the MR multilayer 332 from receiving external magnetic field as a noise. The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes.

Referring also to FIG. 3, the electromagnetic transducer 34 is designed for perpendicular magnetic recording, and includes an upper yoke layer 340, a main magnetic pole 3400, a write coil layer 343, a coil-insulating layer 344, a lower yoke layer 345, and a lower shield 3450.

Figure 5:
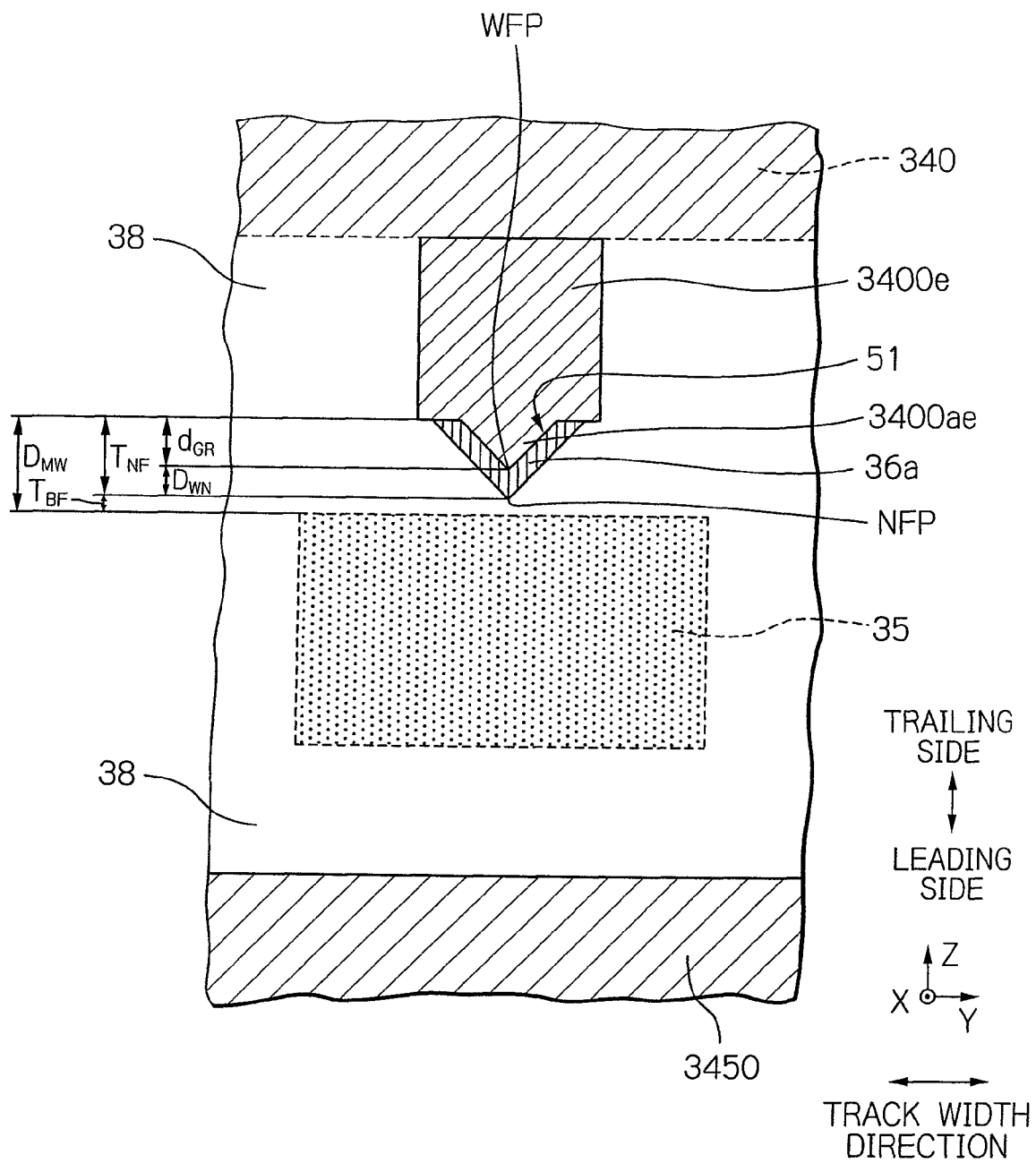
FIG. 5 shows a plain view illustrating the shapes of the end surfaces of the waveguide, the surface plasmon generator and the electromagnetic transducer on the head part end surface or in its vicinity.

The upper yoke layer 340 is formed so as to cover the coil-insulating layer 344, and the main magnetic pole 3400 is formed on an insulating layer 385 made of an insulating material such as $Al_2O_3$ (alumina). These upper yoke layer 340 and main magnetic pole 3400 are magnetically connected with each other, and acts as a magnetic path for converging and guiding magnetic flux toward the magnetic recording layer (perpendicular magnetization layer) of the magnetic disk, the magnetic flux being excited by write current flowing through the write coil layer 343. The main magnetic pole 3400 reaches the head part end surface 2210, and the end surface 3400e of the pole 3400, which is a portion of the end surface 2210, has a vertex closest to the lower shield 3450 (most on the leading side), the vertex being a point (WFP: FIG. 5) where write field is generated. This minute write-field-generating point of the main magnetic pole 3400 enables a fine write field responding to higher recording density to be generated. The main magnetic pole 3400 is formed of a soft-magnetic material with a saturation magnetic flux density higher than that of the upper yoke layer 340, which is, for example, an iron alloy containing Fe as a main component, such as FeNi, FeCo, FeCoNi, FeN or FeZrN. The thickness of the main magnetic pole is, for example, in the range of approximately 0.1 to 0.8 μm.

Figure 11A:
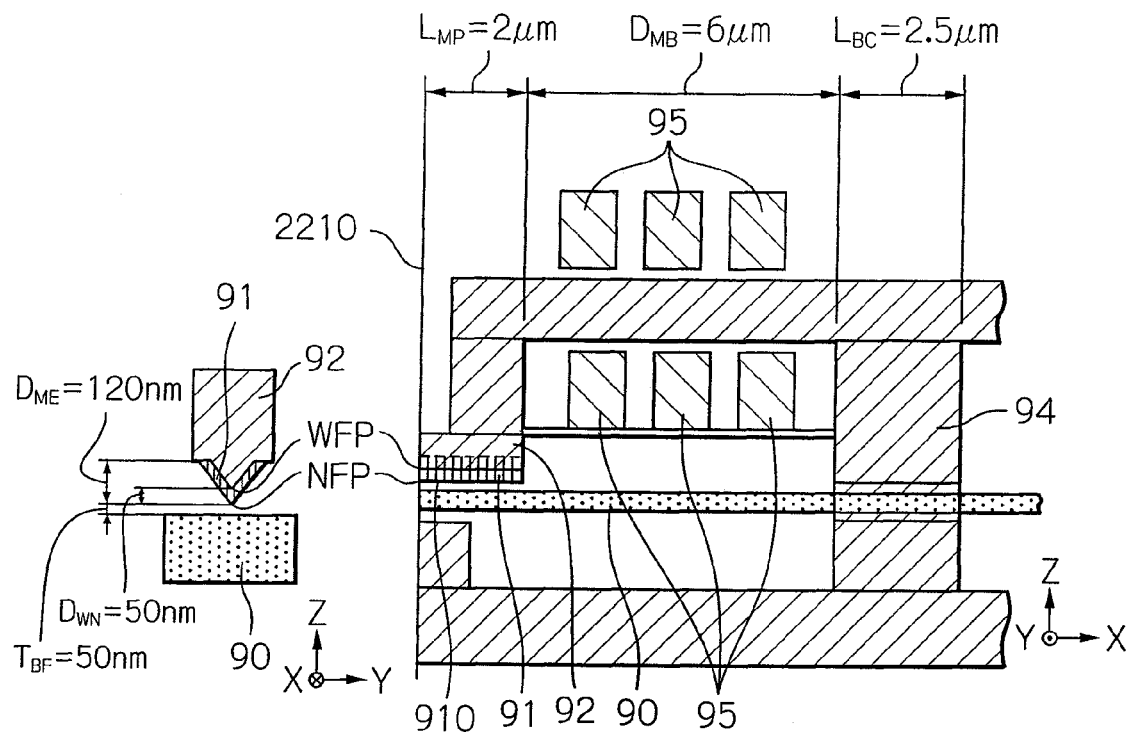
FIGS. 11a and 11b show cross-sectional views taken by ZX-plane, schematically illustrating thermally-assisted magnetic recording heads used in the practical example and the comparative example, respectively.

The write coil layer 343 is formed on an insulating layer 3421 made of an insulating material such as $Al_2O_3$ (alumina), in such a way as to pass through in one turn at least between the lower yoke layer 345 and the upper yoke layer 340, and has a spiral structure with a back contact portion 3402 as a center. The write coil layer 343 is formed of a conductive material such as Cu (copper). The write coil layer 343 is covered with a coil-insulating layer 344 that is formed of an insulating material such as a heat-cured photoresist and electrically isolates the write coil layer 343 from the upper yoke layer 340. The write coil layer 343 has a monolayer structure in the present embodiment. However, the write coil layer 343 may have a two or more layered structure, or may have a helical coil shape in which the upper yoke layer 340 is sandwiched therebetween as shown in FIGS. 11a and 11c. Further, the number of turns of the write coil layer 343 is not limited to that shown in FIG. 3, and may be, for example, in the range from two to seven.

The back contact portion 3402 has a though-hole extending in X-axis direction, and the waveguide 35 and insulating layers that cover the waveguide 35 pass through the though-hole. In the though-hole, the waveguide 35 is away at a predetermined distance of, for example, at least 1 μm from the inner wall of the back contact portion 3402. The distance prevents the absorption of the waveguide light by the back contact portion 3402.

The lower yoke layer 345 is formed on an insulating layer 383 made of an insulating material such as $Al_2O_3$ (alumina), and acts as a magnetic path for the magnetic flux returning from a soft-magnetic under layer that is provided under the magnetic recording layer (perpendicular magnetization layer) of the magnetic disk 10. The lower yoke layer 345 is formed of a soft-magnetic material, and its thickness is, for example, approximately 0.5 to 5 μm. Further, the lower shield 3450 is a magnetic shield that reaches the head part end surface 2210, being magnetically connected with the lower yoke layer 345. The lower shield 3450 is provided on the opposite side to the main magnetic pole 3400 from the surface plasmon generator 36, and acts for receiving the magnetic flux spreading from the main magnetic pole 3400. The lower shield 3450 has a width in the track width direction greatly larger than that of the main magnetic pole 3400. This lower shield 3450 causes the magnetic field gradient between the end portion of the lower shield 3450 and the main magnetic pole 3400 to become steeper. As a result, jitter of signal output becomes smaller, and therefore, error rates during read operations can be reduced. The lower shield 3450 is preferably formed of a material with high saturation magnetic flux density such as NiFe (Permalloy) or an iron alloy as the main magnetic pole 3400 is formed of.

Referring also to FIG. 3, the waveguide 35 and the surface plasmon generator 36 are provided between the lower yoke layer 345 (lower shield 3450) and an upper yoke layer 340 (main magnetic pole 3400), and form an optical system for generating NF-light in the head part 221. The waveguide 35 is provided in parallel with an element-formation surface 2202 and extends from the rear end surface 352 which is a portion of the head part rear end surface 2212 to the end surface 350 on the head part end surface 2210 side. A portion of the upper surface (side surface) of the waveguide 35 and a portion of the lower surface (including a propagation edge 360) of the surface plasmon generator 36 are opposed to each other with a predetermined distance therebetween. The portion sandwiched between these portions forms a buffering portion 50 that has a refractive index lower than that of the waveguide 35. The buffering portion 50 couples laser light propagating through the waveguide 35 to the surface plasmon generator 36 in a surface plasmon mode. The buffering portion 50 may be a portion of the insulating layer 384 that is a part of the overcoat layer 38 or may be a different layer provided in addition to the insulating layer 384.

The surface plasmon generator 36 is located between the waveguide 35 and the main magnetic pole 3400, and includes a NFL-generating end surface 36a that is a portion of the head part end surface 2210. The surface plasmon generator 36 further includes a propagation edge 360 at least a portion of which is opposed to the waveguide 35 across the buffering portion 50 and extends to the NFL-generating end surface 36a. The propagation edge 360 propagates surface plasmon excited by laser light (waveguide light) that has propagated through the waveguide 35. The surface plasmon generator 36 couples with the waveguide light in a surface plasmon mode and propagates surface plasmon along on the propagation edge 360 to emit NF-light from the NFL-generating end surface 36a.

The main magnetic pole 3400 is in surface contact with a surface portion of the surface plasmon generator 36, the surface portion excluding the propagation edge 360. In other words, the main magnetic pole 3400 is in surface contact with all side surfaces of the surface plasmon generator 36 that do not have the propagation edge 360 as one of their boundaries. That is, the main magnetic pole 3400 covers or one end surface of the main magnetic pole 3400 overlaps all side edges (extending in X-axis direction) of the surface plasmon generator 36 except the propagation edge 360. Since the main magnetic pole 3400 is in surface contact with the surface plasmon generator 36, the distance between the end surface 3400e of the main magnetic pole 3400 that generates write field and the NFL-generating end surface 36a of the surface plasmon generator 36 is zero. On the other hand, the propagation edge 360 of the surface plasmon generator 36 is not in contact with the main magnetic pole 3400 at all. Accordingly, the excited surface plasmon can propagate along on the propagation edge 360 without being absorbed by the main magnetic pole 3400. As a result, the NF-light emission point on the NFL-generating end surface 36a of the surface plasmon generator 36 is located at one of the vertices of the NFL-generating end surface 36a, and is a vertex (vertex NFP: FIG. 5) that corresponds to the end of the propagation edge 360 that is not in contact with the main magnetic pole 3400. This can ensure that the NF-light emission point is established in a location sufficiently close to the end surface 3400e of the main magnetic pole 3400 that generates write field.

A detailed explanation of the waveguide 35, the buffering portion 50, the surface plasmon generator 36 and the main magnetic pole 3400 will be given later with reference to FIG. 4. Further, as is in the present embodiment, an inter-element shield layer 39 is preferably provided between the MR element 33 and the electromagnetic transducer 34, sandwiched by the insulating layers 382 and 383. The inter-element shield layer 39 may be formed of a soft-magnetic material, and plays a role for shielding the MR element 33 from magnetic field generated from the electromagnetic transducer 34.

Also according to FIG. 3, the light source unit 23 includes: a unit substrate 230; a laser diode 40 provided on the source-installation surface 2302 of the unit substrate 230; a terminal electrode 410 electrically connected to the lower surface 401 as an electrode of the laser diode 40; and a terminal electrode 411 electrically connected to the upper surface 403 as an electrode of the laser diode 40. The terminal electrodes 410 and 411 are electrically connected to the connection pads of the wiring member 203 provided on the flexure 201 (FIG. 1). By applying a predetermined voltage between both electrodes 410 and 411 of the laser diode 40, laser light is emitted from the emission center on an emission surface 400 of the laser diode 40. Here, in the configuration of the head as shown in FIG. 3, the oscillation of electric field component of the laser light generated from the laser diode 40 preferably has a direction perpendicular to the stacking surface of the active layer 40e (Z-axis direction). That is, the laser diode 40 preferably generates a laser light with TM polarization. This enables the laser light propagating through the waveguide 35 to be coupled with the surface plasmon generator 36 through the buffering portion 50 in a surface plasmon mode.

A light source such as InP base, GaAs base or GaN base diode can be utilized as the laser diode 40, which is usually used for communication, optical disk storage or material analysis. The wavelength $\lambda_L$, of the radiated laser light may be, for example, in the range of approximately 375 nm (nanometers) to 1.7 µm. Specifically, for example, a laser diode of InGaAsP/InP quaternary mixed crystal can also be used, in which possible wavelength region is set to be from 1.2 to 1.67 µm. The laser diode 40 has a multilayered structure including an upper-electrode 40a, an active layer 40e, and a lower-electrode 40i. On the front and rear cleaved surfaces of the multilayered structure of the laser diode 40, respectively formed are reflective layers for exciting the oscillation by total reflection. Further, the reflective layer 42 has an opening in the position of the active layer 40e including the light-emission center 4000. Here, the laser diode 40 has a thickness $T_{LA}$ in the range of, for example, approximately 60 to 200 µm.

Further, an electric source provided within the magnetic disk apparatus can be used for driving the laser diode 40. In fact, the magnetic disk apparatus usually has an electric source with applying voltage of, for example, approximately 2V, which is sufficient for the laser oscillation. The amount of electric power consumption of the laser diode 40 is, for example, in the order of several tens mW, which can be covered sufficiently by the electric source provided within the magnetic disk apparatus. The laser diode 40 and terminal electrodes 410 and 411 are not limited to the above-described embodiment. For example, the electrodes of the laser diode 40 can be turned upside down, thus the n-electrode 40a may be bonded to the source-installation surface 2302 of the unit substrate 230. Further, alternatively, a laser diode may be provided on the element-formation surface 2202 of the thermally-assisted magnetic recording head 21, and then can be optically connected with the waveguide 35. Furthermore, the thermally-assisted magnetic recording head 21 may include no laser diode 40; then, the light-emission center of a laser diode provided within the magnetic disk apparatus and the rear-end surface 352 of the waveguide 35 may be connected by using, for example, optical fiber.

Each of the slider 22 and light source unit 23 may have an arbitrary size. For example, the slider 22 may be so-called a femto slider in which the width in the track width direction (Y-axis direction) is 700 µm; the length (in Z-axis direction) is 850 µm; and the thickness (in X-axis direction) is 230 µm. In the case, the light source unit 23 may be one size smaller than the slider 22, and may have a size, for example, in which the width in the track width direction is 425 µm; the length is 300 µm; and the thickness is 300 µm.

By joining the above-described light source unit 23 and slider 22, constituted is the thermally-assisted magnetic recording head 21. In the joining, the joining surface 2300 of the unit substrate 230 is made having a surface contact with the back surface 2201 of the slider substrate 220. Then, the locations of the unit substrate 230 and the slider substrate 220 are determined in such a way that the laser light generated from the laser diode 40 can directly enter the waveguide 35 through the rear-end surface 352 opposite to the ABS 2200 of the waveguide 35.

Figure 4:
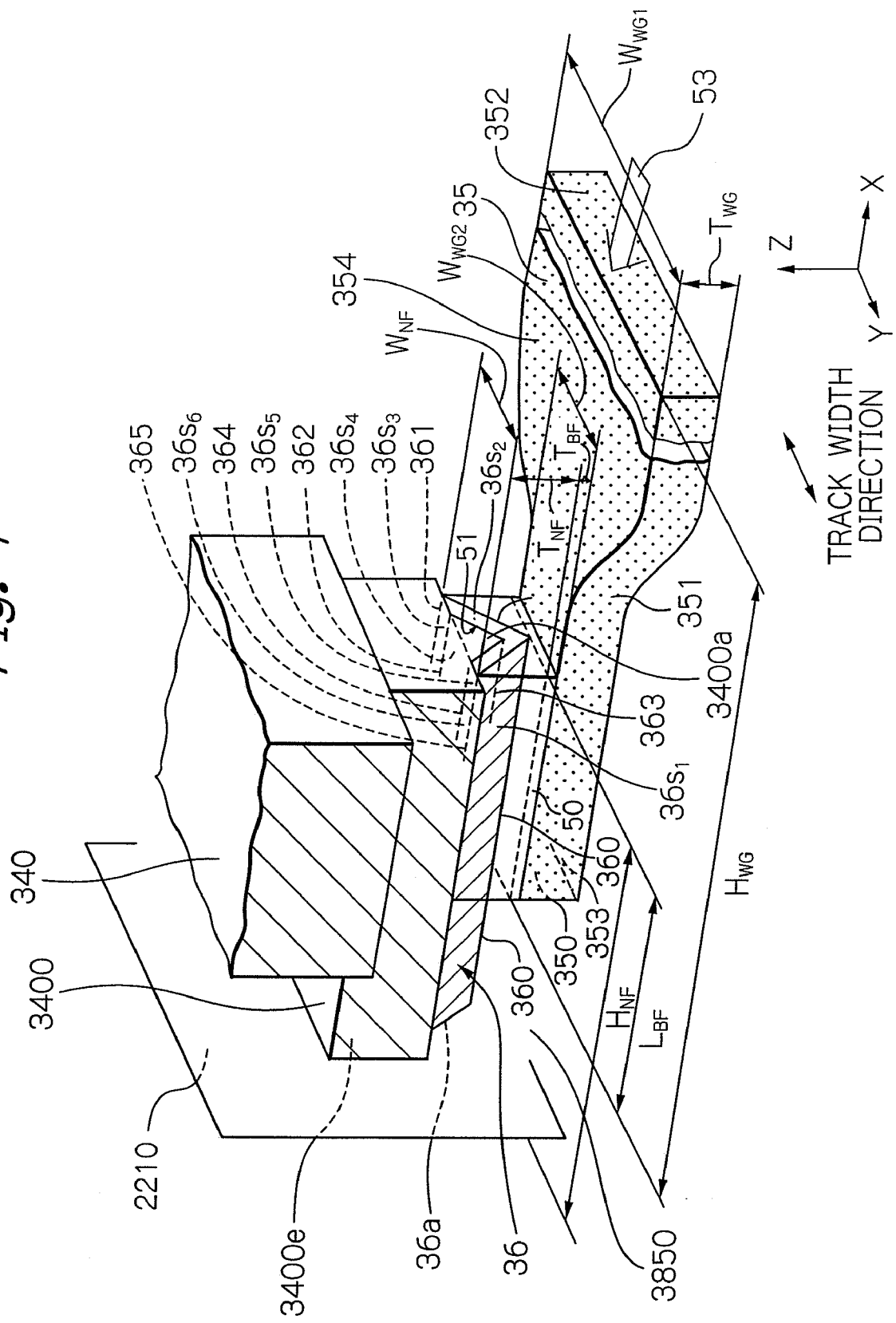
FIG. 4 shows a perspective view schematically illustrating the configuration of the waveguide, the surface plasmon generator and the main magnetic pole.

FIG. 4 shows a perspective view schematically illustrating the configuration of the waveguide 35, the surface plasmon generator 36 and the main magnetic pole 3400. In the figure, the head part end surface 2210 is positioned at the left side, the end surface 2210 including positions where write field and NF-light are emitted toward the magnetic recording medium.

Referring to FIG. 4, there are provided a waveguide 35 that propagates laser light 53 for generating NF-light and a surface plasmon generator 36 including an propagation edge 360 on which surface plasmon excited by the laser light (waveguide light) 53 propagates. The surface plasmon generator 36 further includes a NFL-generating end surface 36a that reaches the head part end surface 2210. A portion between a portion of the side surface 354 of the waveguide 35 and a portion of lower surfaces (side surfaces) $36s_1$ and $36s_2$ including the propagation edge 360 of the surface plasmon generator 36 forms a buffering portion 50. That is, the propagation edge 360 is covered with the buffering portion 50. The buffering portion 50 couples waveguide light 53 to the surface plasmon generator 36 in a surface plasmon mode. The propagation edge 360 propagates surface plasmon excited by the waveguide light 53 to the NFL-generating end surface 36a.

The term "side surfaces" of the surface plasmon generator 36 as used herein refers to end surfaces $36s_1$, $36s_2$, $36s_3$, $36s_4$, $36s_5$, and $36s_6$ except the NFL-generating end surface 36a and the end surface opposed to the NFL-generating end surface 36a in X-axis direction. Further, the term "side surfaces" of the waveguide 35 as used herein refers to the end surfaces 351, 353, and 354 among the surrounding end surfaces of the waveguide 35 except the end surface 350 on the head part end surface 2210 side and the rear end surface 352 opposite to the end surface 350. The side surfaces of the waveguide 35 are capable of totally reflecting waveguide light 53 propagating through the waveguide 35 that acts as a core. In the present embodiment, the side surface 354 of the waveguide 35 a portion of which is in surface contact with the buffering portion 50 is the upper surface of the waveguide 35. The buffering portion 50 may be a portion of the overcoat layer 38 (FIG. 2), or may be a different layer provided in addition to the overcoat layer 38.

More specifically, waveguide light 53 that has traveled to a close proximity to the buffering portion 50 is coupled with the optical configuration including the waveguide 35 having a refractive index of $n_{WG}$, the buffering portion 50 having a refractive index of $n_{BF}$ and the surface plasmon generator 36 made of a conductive material such as a metal, to induce a surface plasmon mode in the propagation edge 360 of the surface plasmon generator 36. That is, the waveguide light 53 couples to the surface plasmon generator 36 in the surface plasmon mode. The induction of the surface plasmon mode is enabled by setting the refractive index $n_{BF}$ of the buffering portion 50 to be smaller than the refractive index $n_{WG}$ of the waveguide 35 ($n_{BF} < n_{WG}$). In practice, evanescent light is excited in the buffering portion 50 under optical conditions at the interface between the waveguide 35 as a core and the buffering portion 50. Then, the evanescent light is combined with charge fluctuations caused on the surface (the propagation edge 360) of the surface plasmon generator 36 to induce the surface plasmon mode and excite surface plasmon 60. The propagation edge 360 is provided at the location closest to the waveguide 35 on the inclined lower surfaces (side surfaces) $36s_1$ and $36s_2$ of the surface plasmon generator 36, and is a corner edge where electric fields tend to concentrate; thereby surface plasmon 60 is highly likely to be excited.

In the embodiment shown in FIG. 4, the surface plasmon generator 36 substantially has a shape of triangular prism extending in X-axis direction in which a substantially V-shaped groove 51 that extends to the NFL-generating end surface 36a is provided in the upper surface on the side opposite to the propagation edge 360. The walls of the groove 51 are side surfaces $36s_4$ and $36s_5$, and the bottom of the groove 51 forms an side edge 363. A portion 3400a of the main magnetic pole 3400 is embedded in the groove 51. The groove 51 is filled with the portion 3400a.

Since the portion 3400a of the main magnetic pole 3400 is embedded in the groove 51, the main magnetic pole 3400 is in surface contact with all side surfaces $36s_3$, $36s_4$, $36s_5$ and $36s_6$ of the surface plasmon generator 36 that do not have the propagation edge 360 as one of their boundaries. Each of the side surfaces $36s_1$ and $36s_2$ of the surface plasmon generator 36 has the propagation edge 360 as one of their boundaries. In other words, the main magnetic pole 3400 covers or one end surface of the main magnetic pole 3400 overlaps all edges 361, 362, 363, 364 and 365 (extending in X-axis direction) of the surface plasmon generator 36 except the propagation edge 360. In the present embodiment, the main magnetic pole 3400 is in contact with the edges 361 and 365 and covers the edges 362, 363 and 364.

In this way, the main magnetic pole 3400 is in surface contact with the surface plasmon generator 36, and therefore the distance between the end surface 3400e of the main magnetic pole 3400 that generates write field and the NFL-generating end surface 36a of the surface plasmon generator 36 is zero. On the other hand, only the propagation edge 360 of the surface plasmon generator 36 among the edges of the generator 36 is positioned at a distance from the main magnetic pole 3400. Accordingly, excited surface plasmon can propagate along on the propagation edge 360 without being absorbed by the main magnetic pole 3400. As a result, the NF-light emission point on the NFL-generating end surface 36a of the surface plasmon generator 36 is one of the vertices of the NFL-generating end surface 36a, and is a vertex (vertex NFP: FIG. 5) that is the end of the propagation edge 360 that is not contact with the main magnetic pole 3400 at all. Since only the propagation edge 360 is not covered or in contact with the main magnetic pole 3400, surface plasmon can be intentionally propagated along on the propagation edge 360 and the NF-light emission point can be reliably set at the vertex NFP (FIG. 5) that is sufficiently close to the end surface 3400e of the main magnetic pole 3400 that generates write field. The propagation edge 360 is rounded in order to prevent surface plasmon from running off the propagation edge 360 and to avoid reduction of the light use efficiency. The radius of curvature of the rounded edge is preferably in the range from 6.25 to 20 nm.

The surface plasmon generator 36 is preferably made of silver (Ag) or an Ag alloy mainly containing Ag. The alloy preferably contains at least one element selected from the group consisting of a palladium (Pd), gold (Au), copper (Cu), ruthenium (Ru), rhodium (Rh), and iridium (Ir). By forming the surface plasmon generator 36 from such an Ag alloy, the NF-light emission efficiency second to Ag, which is a material having theoretically the highest NF-light emission efficiency, can be achieved and, in addition, defects such as cracking and chipping of the propagation edge 360 can be sufficiently minimized.

Referring again to FIG. 4, the waveguide 35 is provided on the −z side (leading side) of the surface plasmon generator 36, that is, on the side opposite to the main magnetic pole 3400 when viewed from the waveguide 35. In this configuration, the waveguide 35 can be located at a distance from the main magnetic pole 3400 even though the end surface 3400e of the main magnetic pole 3400 that generates write field is in contact with the NFL-generating end surface 36a that generates NF-light. This can prevent reduction in the amount of the waveguide light 53 to be converted into NF-light due to partial absorption of the waveguide light 53 into the main magnetic pole 3400 made of a metal.

The waveguide 35 may have a shape with a constant width in the track width direction (Y-axis direction), or as shown in FIG. 4, may have a portion on the head part end surface 2210 side, which has a narrower width in the track width direction (Y-axis direction). The width $W_{WG1}$ in the track width direction (Y-axis direction) of a portion of the waveguide 35 on the rear end surface 352 side may be, for example, in the range approximately from 0.5 to 200 µm, the rear end surface 352 being opposite to the head part end surface 2210 in the waveguide 35. The width $W_{WG2}$ in the track width direction (Y-axis direction) of a portion of the waveguide 35 on the end surface 350 side may be, for example, in the range approximately from 0.3 to 100 µm. And the thickness $T_{WG}$ (in Z-axis direction) of a portion on the rear end surface 352 side may be, for example, in the range approximately from 0.1 to 4 µm, and the height (length) $H_{WG}$ (in X-axis direction) may be, for example, in the range approximately from 10 to 300 µm.

Further, the side surfaces of the waveguide 35: the upper surface 354; the lower surface 353; and both the side surfaces 351 in the track width direction (Y-axis direction) have a surface contact with the overcoat layer 38 (FIG. 2), that is, the insulating layers 384 and 385 (FIG. 3), except the portion having a surface contact with the buffering portion 50. Here, the waveguide 35 is formed of a material with a refractive index $n_{WG}$ higher than a refractive index $n_{OC}$ of the constituent material of the overcoat layer 38, made by using, for example, a sputtering method. For example, in the case that the wavelength $\lambda_L$ of laser light is 600 nm and the overcoat layer 38 is formed of $SiO_2$ (silicon dioxide: n=1.5), the waveguide 35 can be formed of, for example, $Al_2O_3$ (alumina: n=1.63). Further, in the case that the overcoat layer 38 is formed of $Al_2O_3$ (n=1.63), the waveguide 35 can be formed of, for example, $SiO_xN_Y$ (n=1.7-1.85), $Ta_2O_5$ (n=2.16), $Nb_2O_5$ (n=2.33), TiO (n=2.3-2.55) or $TiO_2$ (n=2.3-2.55). This material structure of the waveguide 35 enables the propagation loss of laser light 53 to be reduced due to the excellent optical characteristics of the constituent material. Further, the existence of the waveguide 35 as a core and the overcoat layer 38 as a clad can provide total reflection conditions in all the side surfaces. As a result, more amount of laser light 53 can reach the position of the buffering portion 50, which improves the propagation efficiency of the waveguide 35. Meanwhile, in the present embodiment, a portion of propagation edge 360 that is not opposed to the waveguide 35 (buffering portion 50) may be covered with the constituent material of the overcoat layer 38 having refractive index $n_{OC}$, for example, with a portion 3850 of the insulating layer 385.

Further, alternatively, the waveguide 35 may have a multi-layered structure of dielectric materials in which the upper a layer is in the multilayered structure, the higher becomes the refractive index n of the layer. The multilayered structure can be realized, for example, by sequentially stacking dielectric materials of $SiO_xN_Y$ with the composition ratios X and Y appropriately changed. The number of stacked layers may be, for example, in the range from 8 to 12. In the case that laser light 53 has a linear polarization in Z-axis direction, the above-described structure enables the laser light 53 to propagate in the position closer to the buffering portion 50. In this case, by choosing the composition and layer thickness in each layer, and the number of layers of the multilayered structure, the laser light 53 can propagate in the desired position in Z-axis direction.

The surface plasmon generator 36 can have a width $W_{NF}$ in the track width direction (Y-axis direction) in the upper surface 361, the width $W_{NF}$ being sufficiently smaller than the wavelength of laser light 53, for example, of approximately 10 to 100 nm. And the surface plasmon generator 36 can have a thickness $T_{NF}$ (in Z-axis direction) sufficiently smaller than the wavelength of the laser light 53, for example, of approximately 10 to 100 nm. Further, the length (height) $H_{NF}$ (in X-axis direction) can be set to be, for example, in the range of, approximately 0.8 to 6.0 µm.

The buffering portion 50 is formed of a dielectric material having a refractive index $n_{BF}$ lower than the refractive index $n_{WG}$ of the waveguide 35. For example, when the wavelength $\lambda_L$ of laser light is 600 nm and the waveguide 35 is formed of $Al_2O_3$ (alumina: n=1.63), the buffering portion 50 may be formed of $SiO_2$ (silicon dioxide: n=1.46). Further, when the waveguide 35 is formed of $Ta_2O_5$ (n=2.16), the buffering portion 50 may be formed of $SiO_2$ (n=1.46) or $Al_2O_3$ (n=1.63). In these cases, the buffering portion 50 can be a portion of the overcoat layer 38 (FIG. 2) serving as a clad made of $SiO_2$ (n=1.46) or $Al_2O_3$ (n=1.63). Further, the length $L_{BF}$ (in X-axis direction) of a portion of the buffering portion 50, the portion being sandwiched between the side surface 354 of the waveguide 35 and the propagation edge 360, is preferably in the range of 0.5 to 5 µm, and is preferably larger than the wavelength $\lambda_L$ of the laser light 53. In this preferable case, the coupled portion has an area markedly larger than a so-called "focal region" in the case that, for example, laser light is converged on a buffering portion 50 and a surface plasmon generator 36 and is coupled in a surface plasmon mode. As a result, very stable coupling in the surface plasmon mode can be achieved. The thickness $T_{BF}$ of the buffering portion 50 is preferably set to be, for example, in the range of 10 to 200 nm. The length $L_{BF}$ and the thickness $T_{BF}$ of the buffering portion 50 are important parameters for obtaining proper excitation and propagation of surface plasmon.

As also shown in FIG. 4, the surface plasmon generator 36 is in surface contact with the main magnetic pole 3400. Accordingly, heat generated from the surface plasmon generator 36 when generating NF-light can be partially dissipated into the main magnetic pole 3400. That is, the main magnetic pole 3400 can be used as a heatsink. As a result, excessive rise of temperature of the surface plasmon generator 36 can be suppressed, and an unnecessary protrusion of the NFL-generating end surface 36a and a substantial reduction in light use efficiency in the surface plasmon generator 36 can be avoided. Furthermore, since the surface plasmon generator 36 made of a metal is in contact with the main magnetic pole 3400 also made of a metal, the surface plasmon generator 36 is not electrically isolated and therefore detrimental effects of electrostatic discharge (ESD) can be inhibited.

FIG. 5 shows a plain view illustrating the shapes of the end surfaces of the waveguide 35, the surface plasmon generator 36 and the electromagnetic transducer 34 on the head part end surface 2210 or in its vicinity.

As shown in FIG. 5, in the electromagnetic transducer 34, the main magnetic pole 3400 and the lower shield 3450 reach the head part end surface 2210. The end surface 3400e of the main magnetic pole 3400 on the head part end surface 2210 has a combined shape of a trailing-side portion having, for example, a substantially rectangular, square, or trapezoidal shape and a leading-side portion 3400ae having, for example, a substantially triangular shape embedded in the groove 51 of the surface plasmon generator 36. The vertex WFP most on the leading side in the end surface 3400e is closest to the lower shield 3450, and therefore magnetic fields are most concentrated at the vertex WFP; thus the vertex WFP becomes a write-field generating point. Since the main magnetic pole 3400 has such a small write-field generating point, a minute write field that meets higher recording density can be generated.

The NFL-generating end surface 36a of the surface plasmon generator 36 on the head part end surface 2210 has a shape similar to a V-shape with a predetermined thickness, and is in contact with the end surface 3400e of the main magnetic pole 3400 on the leading side (−Z side) of the surface 3400e. One side edge of the end surface 3400e overlaps with all the side edges that do not end at the vertex NFP, which is the end of the propagation edge 360, among the six side edges of the NFL-generating end surface 36a. In other words, the end surface 3400e covers or one side edge of the end surface 3400e overlaps four vertices (corners) among the five vertices (corners) of the NFL-generating end surface 36a except vertex NFP. As a result, only the vertex NFP among the five vertices (corners) is at a distance from the end surface 3400e, and therefore is capable of functioning as a NF-light emission point.

Since the end surface 3400e of the main magnetic pole 3400 and the NFL-generating end surface 36a are in contact with each other as described above, the distance $D_{WN}$ in Z-axis direction between the vertex WFP of the end surface 3400e that is the write-field generating point and the vertex NFP of the NFL-generating end surface 36a that is the NF-light emission point is equal to the thickness in Z-axis direction of the NFL-generating end surface 36a in the bottom of the groove 51. The bottom of the groove 51 of the surface plasmon generator 36 is at a distance from the propagation edge 360 in the direction along the track (in Z-axis direction). Since the thickness in the bottom of the groove 51 is equal to the difference ($T_{NF}-d_{GR}$) between the thickness $T_{NF}$ of the surface plasmon generator 36 and the depth $d_{GR}$ of the groove 51, it follows that $$D_{WN}=T_{NF}-d_{GR} \quad (1)$$

Figure 6:
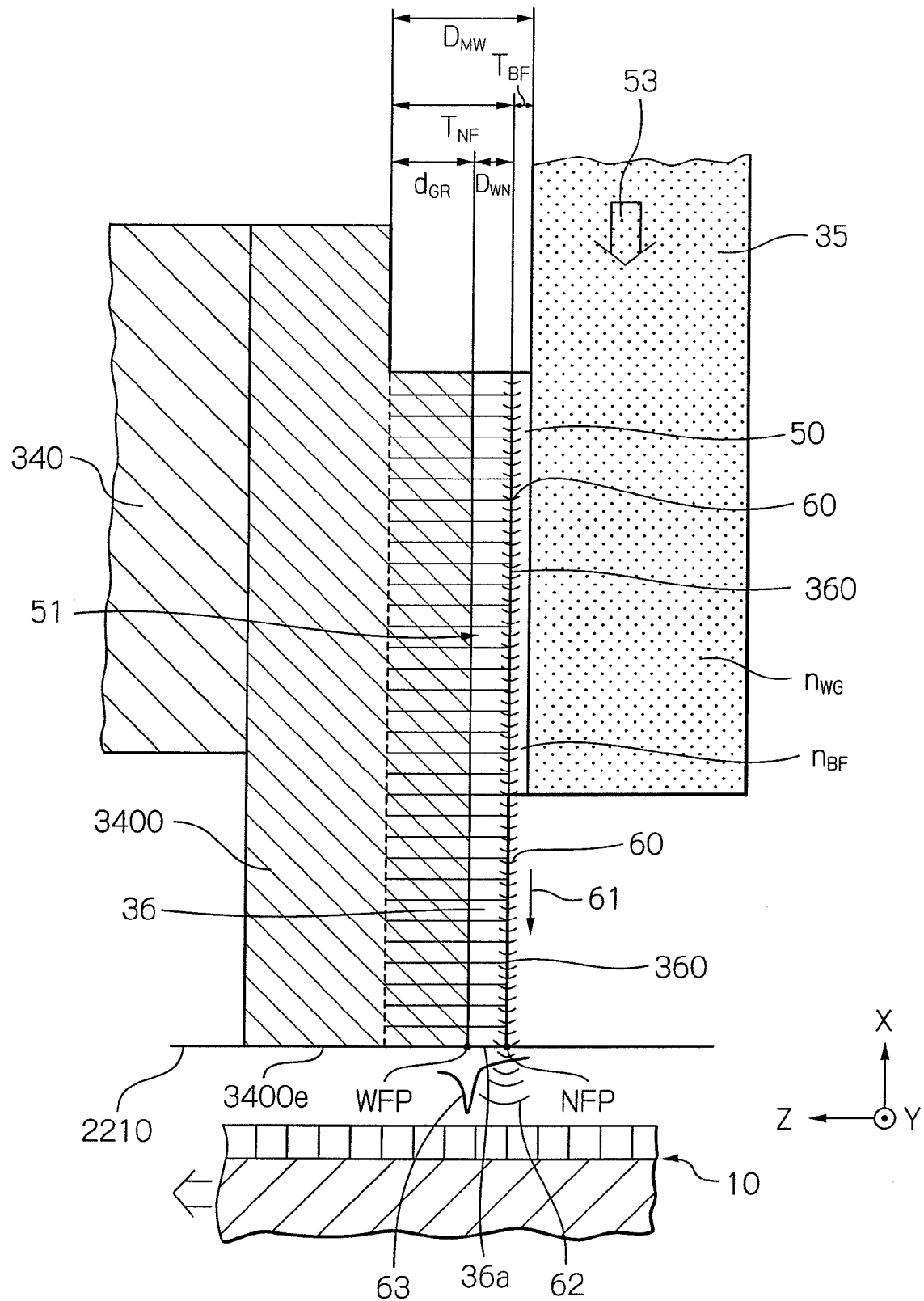
FIG. 6 shows a schematic view for explaining the thermally-assisted magnetic recording utilizing a surface plasmon mode according to the present invention.

Here, reduction in the amount of light to be converted to NF-light due to partial absorption of waveguide light into the main magnetic pole 3400 made of a metal can be prevented by ensuring a certain distance $D_{MW}$ (=$T_{NF}+T_{BF}$) between the portion of the main magnetic pole 3400 that is not embedded in the groove 51 and the waveguide 35. This applies especially to a distance $D_{MW}$ in the case that the main magnetic pole 3400 is longer than the surface plasmon generator 36 in X-axis direction as shown in FIG. 6 later. It can be seen from expression (1) that, in order to ensure a sufficiently close distance between vertices WFP and NFP under the condition that $T_{NF}$ is kept at a predetermined value to provide a required distance $D_{MW}$, the depth $d_{GR}$ of the groove 51 is chosen to be sufficiently large. As will be described later with respect to practical examples, the distance $D_{WN}$ between the vertex WFP that is the write-field generating point and the vertex NFP that is the NF-light emission point is preferably 30 nm or more, and 100 nm or less.

In summary, in the thermally-assisted magnetic recording head according to the present invention, the distance between the vertex NFP that acts as a heating point during writing and the vertex WFP that acts as a writing point can be set to a sufficiently small value. This enables a write field having a sufficiently large gradient to be applied to a sufficiently heated portion in the magnetic recording layer of a magnetic disk. Consequently, a thermally-assisted, stable write operation can be ensured.

FIG. 6 shows a schematic view for explaining the thermally-assisted magnetic recording utilizing a surface plasmon mode according to the present invention. The figure shows a case that the main magnetic pole 3400 is alternatively longer in X-axis direction than the surface plasmon generator 36. However, the principle of thermally-assisted magnetic recording explained below apples to the respective embodiments shown in FIG. 4 and FIG. 6.

Referring to FIG. 6, when the electromagnetic transducer 34 writes data onto the magnetic recording layer of the magnetic disk 10, first, laser light 53 emitted from the laser diode 40 of the light source unit 23 propagates through the waveguide 35. Next, the laser light (waveguide light) 53, which has advanced to near the buffering portion 50, couples with the optical configuration including the waveguide 35 with a refractive index $n_{WG}$, the buffering portion 50 with a refractive index $n_{BF}$ and the surface plasmon generator 36 made of a conductive material such as a metal, and induces a surface plasmon mode on the propagation edge 360 of the surface plasmon generator 36. That is, the waveguide light couples with the surface plasmon generator 36 in the surface plasmon mode. Actually, evanescent light is excited within the buffering portion 50 based on the optical boundary condition between the waveguide 35 as a core and the buffering portion 50. Then, the evanescent light couples with the fluctuation of electric charge excited on the metal surface (propagation edge 360) of the surface plasmon generator 36, and induces a surface plasmon mode, and thus surface plasmon is excited. To be exact, there excited is surface plasmon polariton in this system because surface plasmon as elementary excitation is coupled with an electromagnetic wave. However, the surface plasmon polariton will be hereinafter referred to as surface plasmon for short. The propagation edge 360 is provided at the location closest to the waveguide 35 on the inclined lower surfaces of the surface plasmon generator 36, and is a corner edge where electric fields tend to concentrate; thereby surface plasmon is highly likely to be excited. This surface plasmon mode can be induced by setting the refractive index $n_{BF}$ of the buffering portion 50 to be smaller than the refractive index $n_{WG}$ of the waveguide 35 ($N_{BF}<N_{WG}$) and by appropriately choosing: the length (in X-axis direction) of the buffering portion 50, that is, the length $L_{BF}$ of the coupling portion between the waveguide 35 and the surface plasmon generator 36; and the thickness $T_{BF}$ (in Z-axis direction) of the buffering portion 50.

In the induced surface plasmon mode, surface plasmon 60 is excited on the propagation edge 360 of the surface plasmon generator 36, and propagates along on the edge 360 in the direction shown by arrow 61. Only the propagation edge 360 among side edges of the surface plasmon generator 36 is not covered or in contact with the main magnetic pole 3400, and therefore is not negatively affected by the pole 3400 that is not adjusted so as to excite surface plasmon efficiently. As a result, the surface plasmon can be propagated on the propagation edge 360 by design.

As described above, by the above-described propagation of the surface plasmon 60 in the direction of arrow 61 on the propagation edge 360, the surface plasmon 60, namely, electric field converges at the vertex NFP of the NFL-generating end surface 36a, which reaches the head part end surface 2210 and is the destination of the propagation edge 360. As a result, NF-light 62 is emitted from the vertex NFP. The NF-light 62 is radiated toward the magnetic recording layer of the magnetic disk 10, and reaches the surface of the magnetic disk 10 to heat a portion of the magnetic recording layer of the magnetic disk 10. This heating reduces the anisotropic magnetic field (coercive force) of the portion to a value with which write operation can be performed. Immediately after the heating, write field 63 generated from the main magnetic pole 3400 is applied to the portion to perform write operation. Thus, the thermally-assisted magnetic recording can be achieved.

In the magnetic recording, by intentionally propagating surface plasmon on the propagation edge 360 and then generating NF-Light with maximum intensity at the vertex NFP of the NFL-generating end surface 36a, the emitting position of NF-light 62 can be set to be sufficiently closer to the position of generating write field 63. This enables a write field having a sufficiently large gradient to be applied to a sufficiently heated portion in the magnetic recording layer of the magnetic disk 10. Consequently, a thermally-assisted, stable write operation can be reliably performed.

Meanwhile, in a conventional case in which a NFL-generator provided on the end surface of a head is directly irradiated with the laser light propagating through a waveguide, most of the irradiating laser light has been converted into thermal energy within the NFL-generator. In this case, the size of the NFL-generator has been set smaller than the wavelength of the laser light, and its volume is very small. Therefore, the NFL-generator has been brought to a very high temperature, for example, 500° C. (degrees Celsius) due to the thermal energy. As a result, there has been a problem that the end of a read head element, which reaches the opposed-to-medium surface, becomes relatively far apart from the magnetic disk due to the thermal expansion of the generator, which makes it difficult to properly read servo signals during recording operations. Further, there has been another problem that the light use efficiency is degraded because thermal fluctuation of free electrons increases in the NFL-generator.

On the contrary, in the thermally-assisted magnetic recording according to the present invention, a surface plasmon mode is used, and NF-light 62 is generated by propagating surface plasmon 60 toward the head part end surface 2210. This brings the temperature at the NFL-generating end surface 36a to, for example, about 100° C. during the emission of NF-light, the temperature being drastically reduced compared to the conventional. Thus, this reduction of temperature allows the protrusion of the NFL-generating end surface 36a toward the magnetic disk 10 to be suppressed; thereby favorable thermally-assisted magnetic recording can be achieved.

Furthermore, the length $L_{BF}$ of the whole buffering portion 50, that is, the portion through which the waveguide 35 and the surface plasmon generator 36 are coupled with each other in a surface plasmon mode, is preferably larger than the wavelength $\lambda_L$ of the laser light 53. In this preferable case, the coupled portion has an area markedly larger than a so-called "focal region" in the case that, for example, laser light is converged on a buffering portion and a surface plasmon generator and coupled in a surface plasmon mode. Therefore, the configuration quite different from the system including such "focal region" can be realized in the present invention; thus, very stable coupling in the surface plasmon mode can be achieved. The induction of a surface plasmon mode is disclosed in, for example, Michael Hochberg, Tom Baehr-Jones, Chris Walker & Axel Scherer, "Integrated Plasmon and dielectric waveguides", OPTICS EXPRESS Vol. 12, No. 22, pp 5481-5486 (2004), U.S. Pat. No. 7,330,404 B2, and U.S. Pat. No. 7,454,095 B2.

FIGS. 7a to 7d show schematic views illustrating various embodiments regarding the NFL-generating optical system and the main magnetic pole according to the present invention. Here, FIGS. 7a and 7b are cross-sections taken by YZ-plane, and FIGS. 7c and 7d are cross-sections taken by ZX-plane.

Referring to FIG. 7a, a portion 71a of a main magnetic pole 71 that has a cross-section of substantially rectangular (square) shape is embedded in a groove of a surface plasmon generator 70. Accordingly, the main magnetic pole 71 is in surface contact with all side surfaces of the surface plasmon generator 70 that do not have a propagation edge 700 as one of their boundaries. In this embodiment, on the head part end surface as an opposed-to-medium surface, the distance between the edge (where write field is generated) of the bottom 710 of the main magnetic pole portion 71a and the end point of the propagation edge 700 (where NF-light is generated) can be set sufficiently small. This enables a write field having a sufficiently large gradient to be applied to a sufficiently heated portion in the magnetic recording layer of a magnetic disk. This ensures a stable, thermally assisted write operation. A cross-section of the main magnetic pole portion 71a can have any of various other shapes. However, a cross-sectional shape that has a vertex at the bottom of the groove 51 of the surface plasmon generator 36, as shown in FIGS. 4 and 5 in which the main magnetic pole portion 3400a has an inverted-triangular shape, enables the write-field generating portion to be made very small (vertex WFP in FIG. 5).

Referring to FIG. 7b, a surface plasmon generator 72 has a cross-section of substantially triangular shape and does not have a groove. A main magnetic pole 73 has a cross-section of substantially rectangular (square) shape, and is located in contact with the surface plasmon generator 72 and on the side opposite to the waveguide 35 in relation to the generator 72. In the present embodiment, the main magnetic pole 73 is in surface contact with a surface portion of the surface plasmon generator 72 that does not include the propagation edge 720. In other words, the main magnetic pole 73 is in surface contact with the side surface of the surface plasmon generator 72 that does no have the propagation edge 720 as one of its boundaries, that is, the side surface 721. In this case, on the head part end surface 2210, the distance between the edge (where write field is generated) of the bottom 730 of the main magnetic pole 73 and the end point of the propagation edge 720 (where NF-light is generated) is equal to the thickness $T_{72}$ of the surface plasmon generator 72 in Z-axis direction. Accordingly, the write-field generating portion and the NFL-generating portion can be located sufficiently close to each other by choosing the thickness $T_{72}$ to be as small as possible.

Referring to FIG. 7c, a portion 75a of a main magnetic pole 75 is embedded in a groove of a surface plasmon generator 74. The main magnetic pole 75 is in surface contact with all side surfaces of the surface plasmon generator 74 that do not have a propagation edge 740 as one of their boundaries. Furthermore, the surface plasmon generator 74 is tapered down toward the head part end surface 2210 in Z-axis direction in such a manner that the propagation edge 740 inclines upward as it approaches the head part end surface 2210. Referring now to FIG. 7d, a portion 77a of a main magnetic pole 77 is embedded in a groove of a surface plasmon generator 76. The main magnetic pole 77 is in surface contact with all side surfaces of the surface plasmon generator 76 that do not have a propagation edge 760 as one of their boundaries. Further, the surface plasmon generator 76 is tapered in Z-axis direction toward the head part end surface 2210 in such a manner that the surface on the side opposite to the propagation edge 760 inclines downward as it approaches the end surface 2210. Accordingly, the main magnetic pole 77 inclines downward towards the head part end surface 2210. In the embodiments shown in FIGS. 7c and 7d, the distance $D_{MW}$ between the portion of the main magnetic pole that is not embedded in the groove and the waveguide 35 can be set larger while the write-field generating portion and the NF-light generating portion are located sufficiently close to each other by choosing the thickness of the surface plasmon generator at the head part end surface 2210 to be sufficiently small. This can circumvent the problem of reduction in the amount of light to be converted to NF-light due to partial absorption of waveguide light into the main magnetic pole. In the embodiment in FIG. 7d, the propagation edge 760 linearly extends toward the head part end surface 2210 to avoid the propagation loss that would otherwise be caused by a curvature of the edge.

FIGS. 8a to 8f show schematic views illustrating an embodiment of processes for forming the surface plasmon generator 36 having the groove 51 and the main magnetic pole 3400 according to the present invention. The figures depict cross-sections taken by YZ-plane.

Figure 8A:
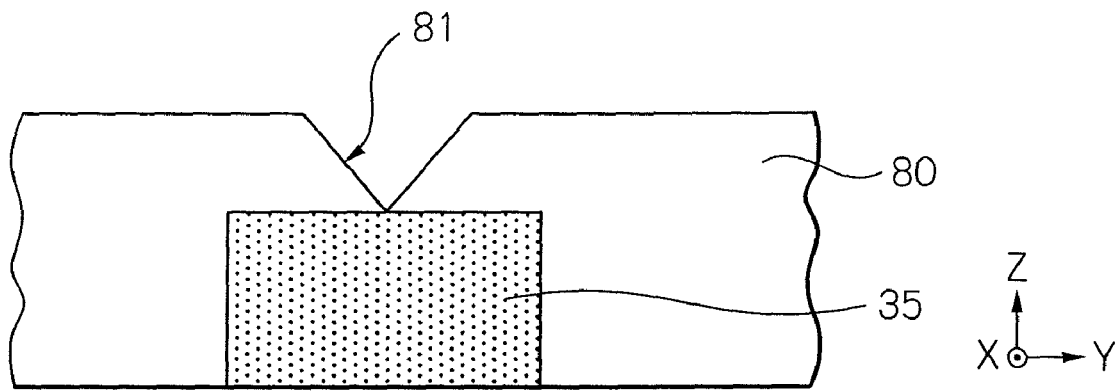
FIGS. 8a to 8f show schematic views illustrating an embodiment of processes for forming the surface plasmon generator having the groove and the main magnetic pole according to the present invention.
Figure 8B:
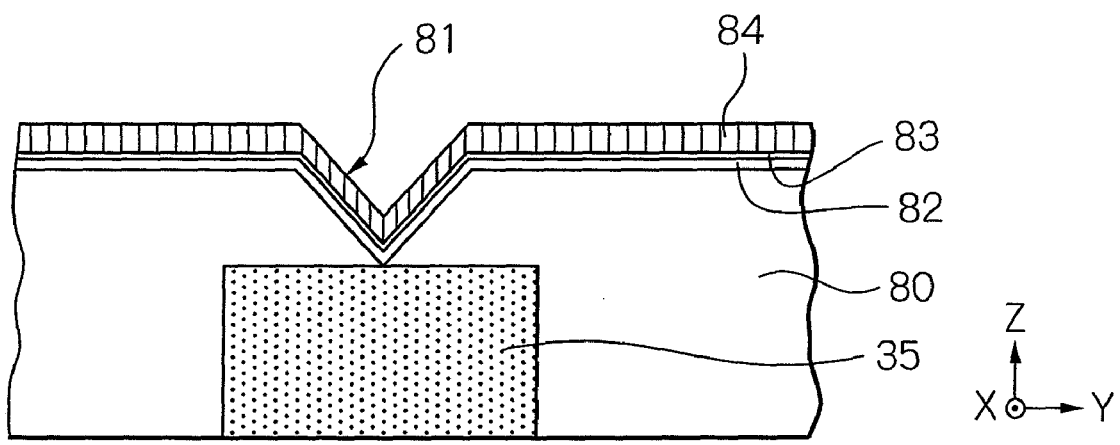

First, as shown in FIG. 8a, a groove 81 having a V-shaped cross-section is formed in an already provided overcoat layer 80 made of, for example, $Al_2O_3$ (alumina) covering a waveguide 35 made of, for example, $TaO_x$ by performing an etching such as a reactive ion etching (RIE) with $CF_4$ as a reactive gas and with a given mask. Then, as shown in FIG. 8b, an insulating film 82 made of, for example, $Al_2O_3$ (alumina) is formed to cover the groove with use of, for example, a sputtering. A portion of the insulating film 82 will later define a gap, that is, a buffering portion 50, between the waveguide 35 and the surface plasmon generator 36.

Figure 8C:
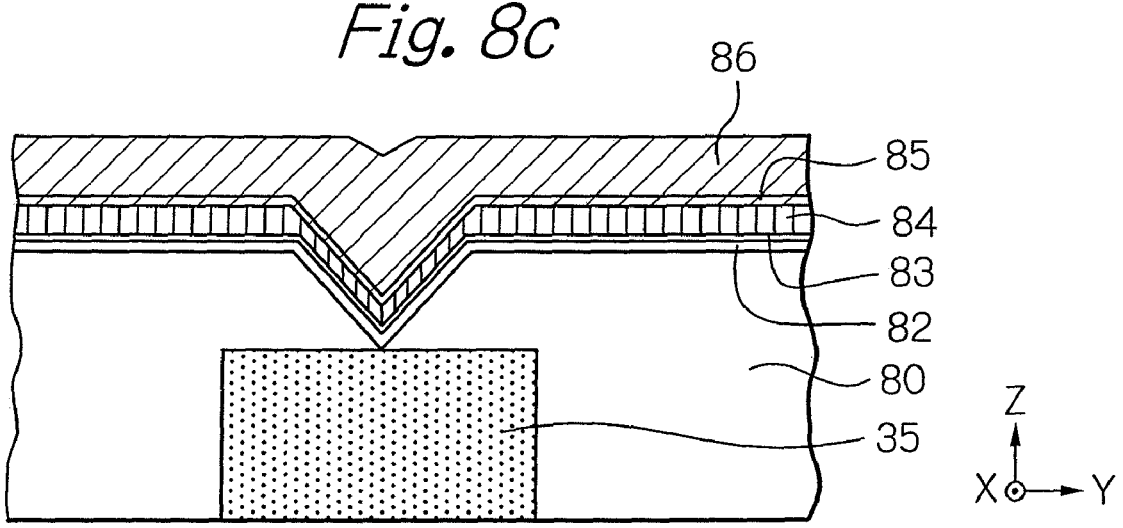
Figure 8D:
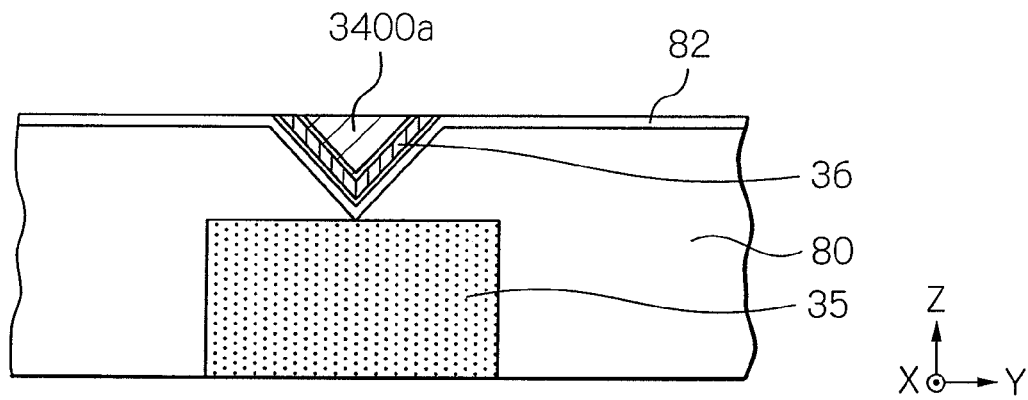

Then, as shown also in FIG. 8b, an adhesion layer 83 made of Ta is formed with a thickness of, for example, approximately 1 nm so as to cover the formed insulating film 82. After that, a metal layer 84 made of, for example, Ag or an alloy of Ag is formed on the adhesion layer 83 and at least in the groove 81 by using, for example, a sputtering. A portion of the metal layer 84 will later constitute the surface plasmon generator 36. Then, as shown in FIG. 8c, an electrode film 85 made of a magnetic material such as FeCo, which will constitute a main magnetic pole, is formed with a thickness of, for example, approximately 50 nm so as to cover the metal layer 84. After that, a magnetic layer 86 made of a magnetic material such as FeCo, which also will constitute the main magnetic pole, is formed with a thickness of, for example, approximately 0.5 μm by using, for example, a plating. Then, as shown in FIG. 8d, the entire surface is etched by a dry etching such as an ion milling to expose the insulating layer 82 in the regions except the groove 81. As a result, the surface plasmon generator 36 is formed, and the remaining portion of the electrode film 85 and the magnetic layer 86 constitute a portion 3400a of the main magnetic pole 3400 that is embedded in the groove formed in the surface plasmon generator 36.

Figure 8E:
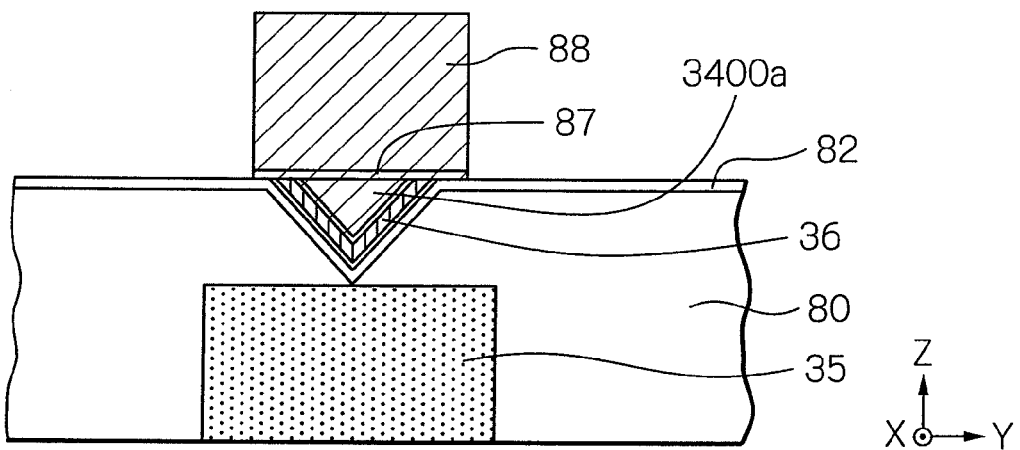
Figure 8F:
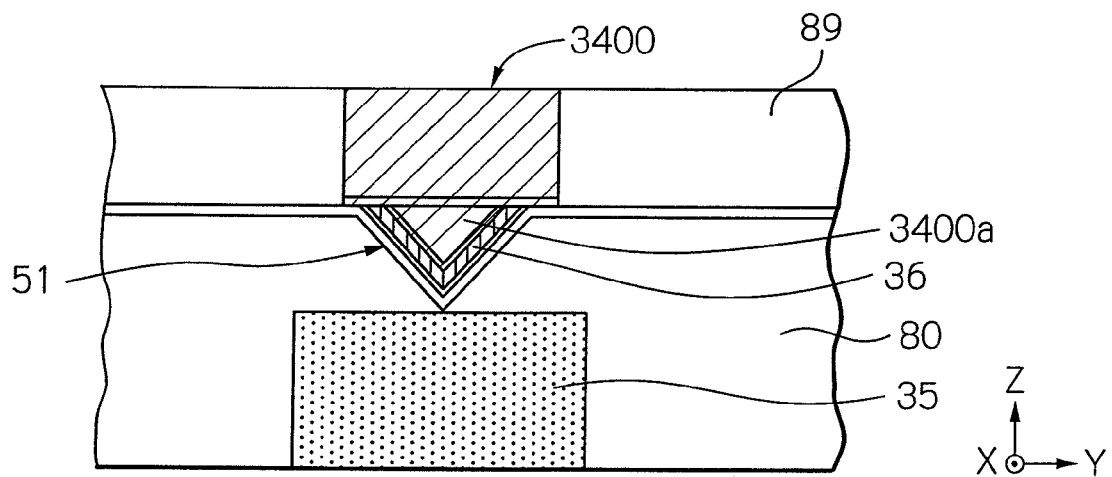

Then, as shown in FIG. 8e, an electrode film 87 made of a magnetic material such as FeCo, which will constitute the main magnetic pole, is formed again, and then a magnetic layer 88 is formed by using, for example, a plating. Next, an overcoat layer 89 made of, for example, $Al_2O_3$ (alumina) is formed by using, for example, a sputtering so as to cover the formed magnetic layer 88. After that, a polishing method such as a chemical mechanical polishing (CMP) is used to planarize the surface to complete the main magnetic pole 3400.

It is understood that the forming method described above can be used to provide a thermally-assisted magnetic recording head 21 having a main magnetic pole 3400, a part 3400a of which is embedded in a groove 51 provided in a surface plasmon generator 36 to ensure that the NF-light emission point can be located sufficiently close to the write-field generating point.

Practical Example

NF-Light Intensity

Hereinafter, practical examples will be described in which generation of NF-light in a NFL-generating optical system of the thermally-assisted magnetic recording head according to the present invention was analyzed in simulations.

Figure 9:
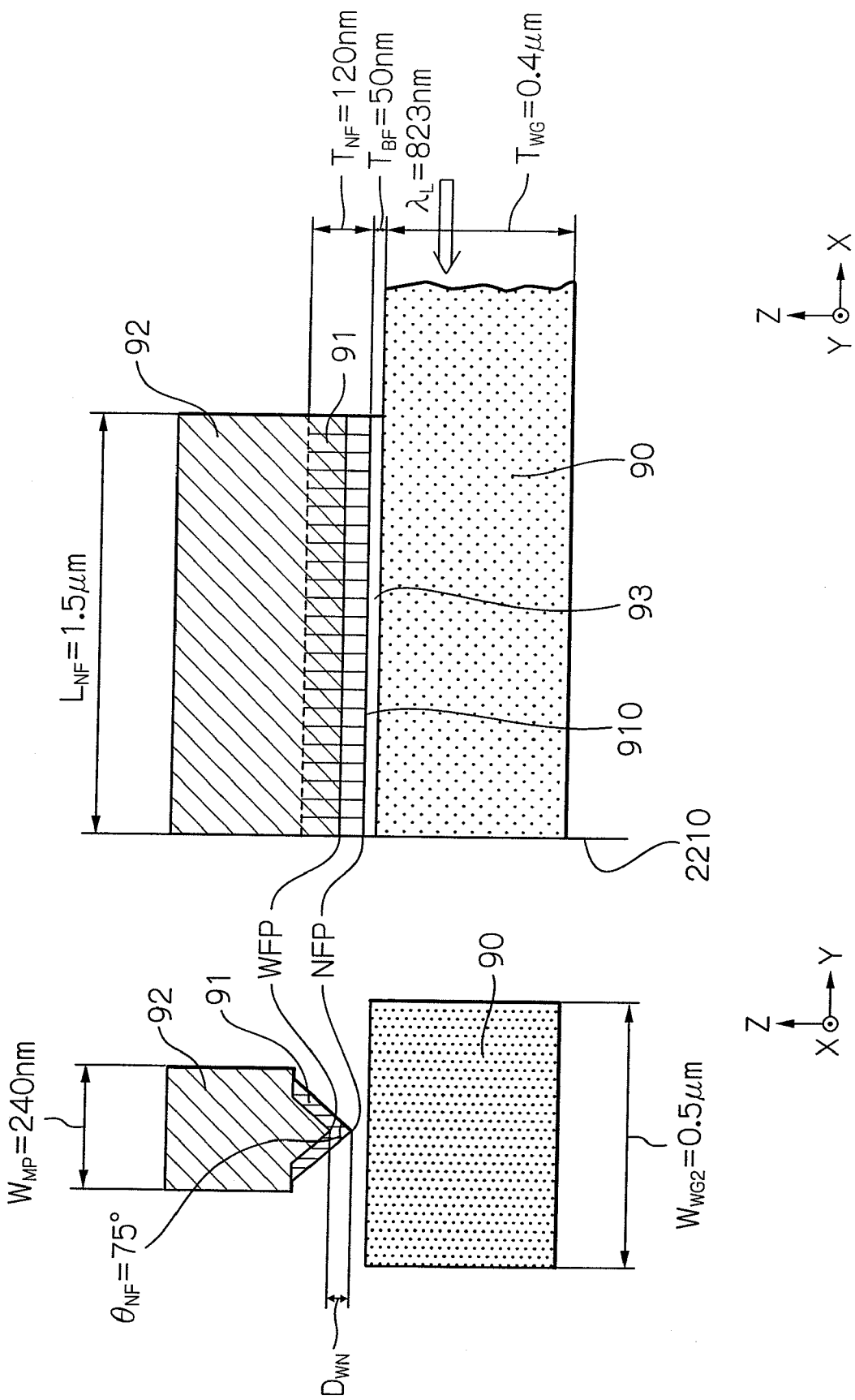
FIG. 9 shows a schematic view illustrating a system used in the simulation analysis experiment.

The simulation analysis experiment was conducted by using three-dimensional Finite-Difference Time-Domain (FDTD) method, which is an electromagnetic field analysis. FIG. 9 shows a schematic view illustrating a system used in the simulation analysis experiment. Referring to in FIG. 9, laser light that entered a waveguide 90 was a TM-polarized Gaussian beam having a wavelength $\lambda_L$ of 823 nm, the TM-polarization having the electric-field oscillation direction of the laser light perpendicular to the layer surface of the waveguide 90, that is, in z-axis direction. The intensity $I_{IN}$ of the laser light was 1.0 $(V/m)^2$.

The waveguide 90 had a width $W_{WGZ}$ of 0.5 μm and a thickness $T_{WG}$ of 0.4 μm, and was made of $TaO_x$, (with a refractive index $n_{WG}$ of 2.15). A surface plasmon generator 91 had a thickness $T_{NF}$ of 120 nm, and was made of Ag. The real part of the refractive index of the Ag was 0.182 and the imaginary part was 5.370. The vertex angle $\theta_{NF}$ at the vertex NFP on the head part end surface 2210 of the surface plasmon generator 91 was 75 degrees) (°). The curvature radius of the propagation edge 910 was 15 nm. The clad portion of the waveguide 90 including a buffering portion 93 was made of $Al_2O_3$ (refractive index n=1.65). The buffering portion 93 had a thickness $T_{BF}$ of 50 nm. The length $L_{BF}$ (in X-axis direction) of the buffering portion 93 sandwiched between the waveguide 90 and the surface plasmon generator 91 was 1.5 μm, which was the same as the length of the main magnetic pole 92. The main magnetic pole 92 was made of FeCo. The real part of the refractive index of the FeCo was 3.08 and the imaginary part was 3.9. The width $W_{MP}$ in the track width direction (in Y-axis direction) of the main magnetic pole 92 was 240 nm.

Under the experimental conditions described above, there was measured, by the simulation, the relationship between: the distance $D_{WN}$ between the vertex NFP that was the NF-light emission point of the surface plasmon generator 91 and the vertex WFP that was the write-field generating point of the main magnetic pole 92; and the intensity of NF-light emitted from the vertex NFP.

Figure 10:
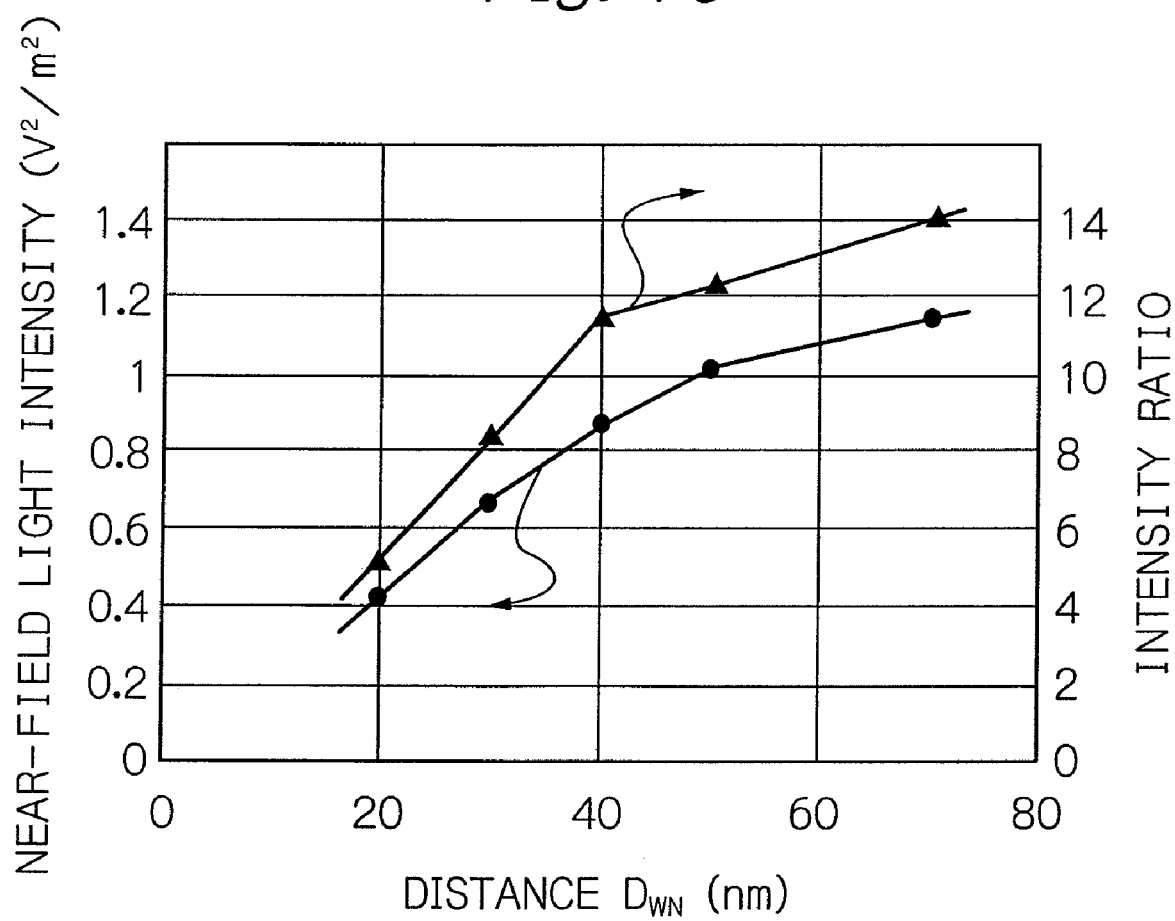
FIG. 10 shows a graph illustrating the simulation measurement results listed in Table 1.

Table 1 shows the result of simulation measurements of the relationship between the distance $D_{WN}$ and the intensity ratio $I_{NF}/I_{WG}$ of the peak intensity $I_{NP}$ of generated NF-light to the peak intensity $I_{WG}$ of waveguide light. FIG. 10 shows a graph illustrating the simulation measurement results listed in Table 1. The peak intensity $I_{NF}$ of NF-light and the peak intensity $I_{WG}$ of waveguide light are values at the vertex NFP on the head part end surface 2210 and at the waveguide-light intensity peak point WGP, respectively (FIG. 9).

TABLE 1

| Distance $D_{WN}$ (nm) | NF-light peak intensity $I_{NF}$ ($V^2/m^2$) | Waveguide light peak intensity $I_{WG}$ ($V^2/m^2$) | Intensity ratio $I_{NF}/I_{WG}$ |
|---|---|---|---|
| 20 | 0.432 | 0.085 | 5.08 |
| 30 | 0.673 | 0.079 | 8.52 |
| 40 | 0.876 | 0.076 | 11.5 |
| 50 | 1.017 | 0.082 | 12.4 |
| 70 | 1.153 | 0.082 | 14.1 |

As can be seen from Table 1 and FIG. 10, the NF-light peak intensity $I_{NF}$ and intensity ratio $I_{NF}/I_{WG}$ increase with increasing distance $D_{WN}$. Thermally-assisted magnetic recording in practice using NF-light requires a ratio of the intensity of desired NF-light to the intensity of waveguide light incidental to the NF-light of 5:1 or higher in order to form only a desired recording pit. Therefore, it can be seen that the distance $D_{WN}$ is preferably greater than or equal to 30 nm to ensure that the intensity ratio $I_{NF}/I_{WG}$ exceeds 5:1. When the distance $D_{WN}$ is 20 nm, the peak intensity $I_{NF}$ of NF-light is less than a half of the value that can be obtained with a distance $D_{WN}$ of 50 nm. Therefore, it will be understood that the effect of reduction in the thickness of the surface plasmon generator 91 is crucial.

Experiments have shown that in order to apply a write field having a required gradient to a sufficiently heated region in the magnetic recording layer of a magnetic disk, the distance $D_{WN}$ needs to be less than or equal to 100 nm. Therefore, it will be understood that the distance $D_{WN}$ between the vertex NFP that is the NF-light emission point and the vertex WFP that is the write-field generating point, that is, the distance between the bottom of the groove in the surface plasmon generator 91 and the propagation edge 910 is preferably 30 nm or more and preferably 100 nm or less.

Practical Example and Comparative Example

Write Field Intensity

A practical example will be given next in which the intensity of write field from the thermally-assisted magnetic recording head according to the present invention was analyzed in simulation. For the purpose of comparison, a comparative example will also be given in which there has been analyzed, by simulation, the intensity of write field generated from a magnetic recording head having a main magnetic pole that was not embedded in a surface plasmon generator but spaced apart from the generator.

Figure 11B:
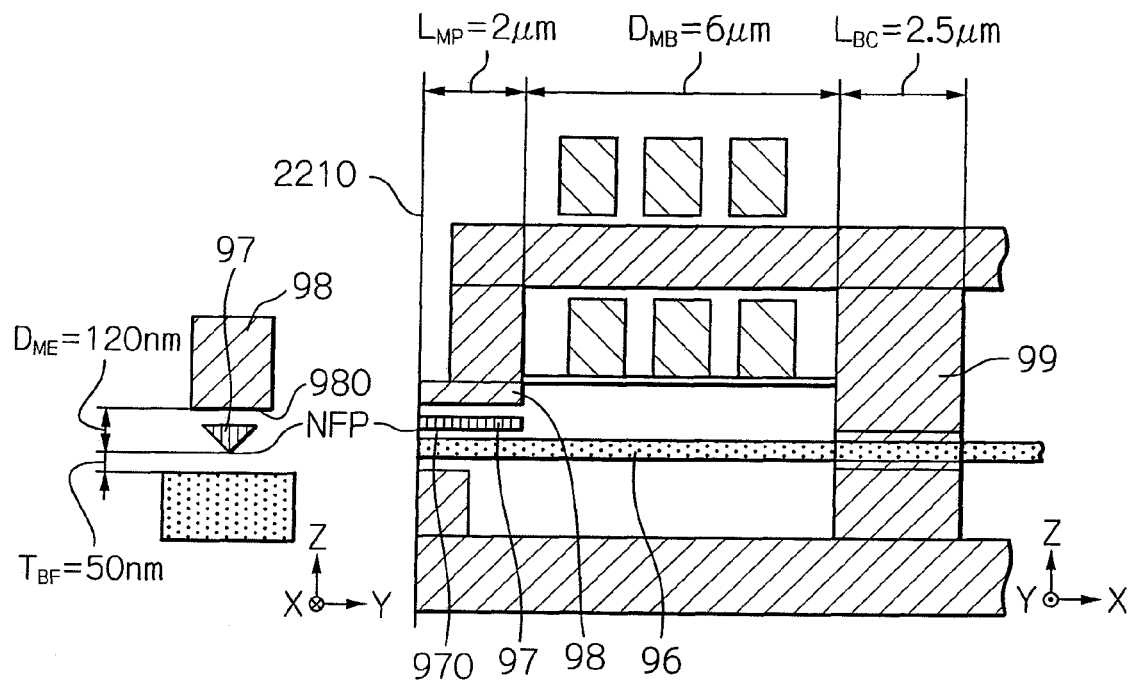
Figure 11C:
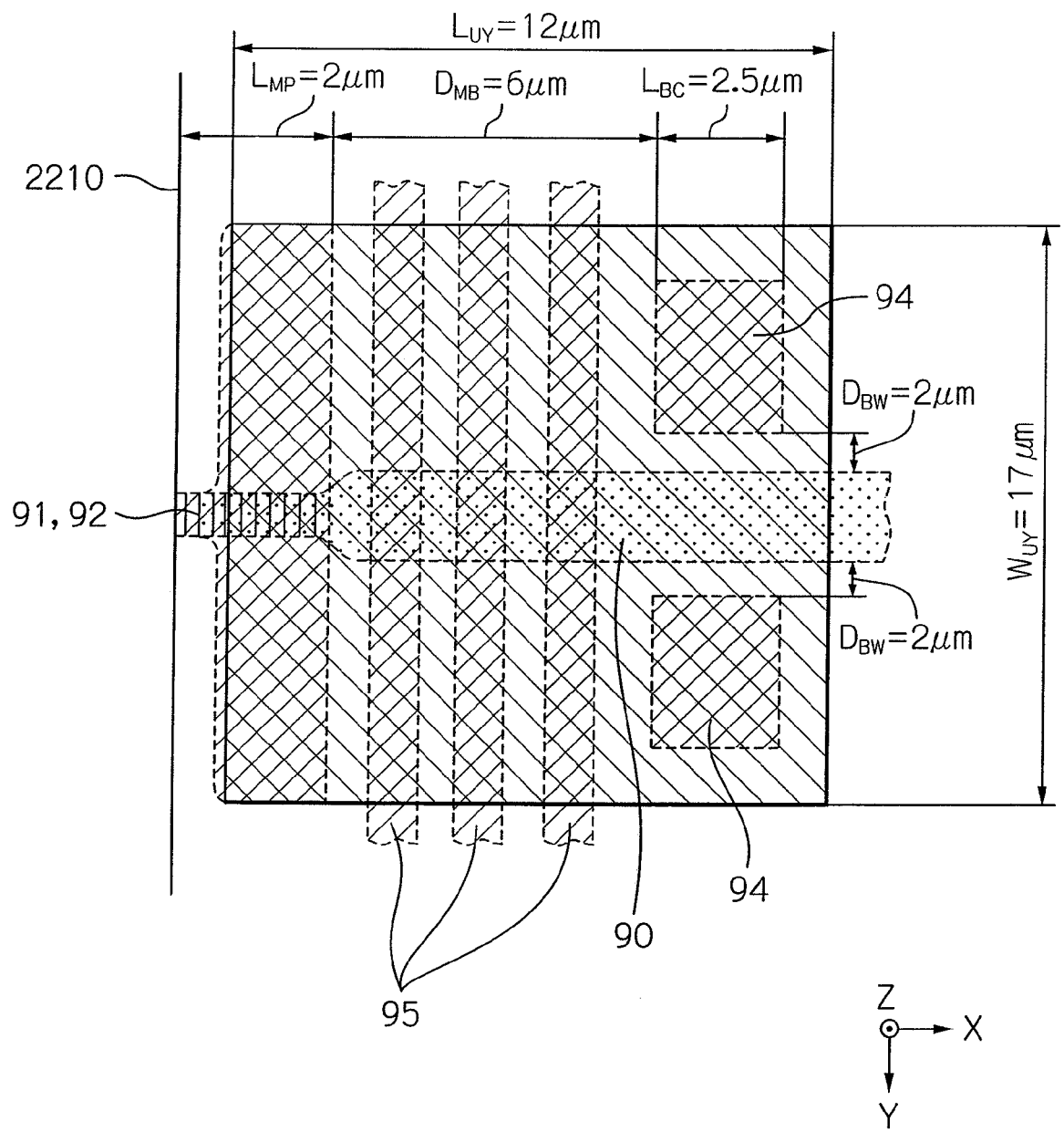
FIG. 11c shows a cross-sectional view taken by XY-plane included in an upper yoke layer, schematically illustrating the thermally-assisted magnetic recording head used in the practical and comparative examples.

FIGS. 11a and 11b show cross-sectional views taken by ZX-plane, schematically illustrating thermally-assisted magnetic recording heads used in the practical example and the comparative example, respectively. FIG. 11c shows a cross-sectional view taken by XY-plane included in an upper yoke layer, schematically illustrating the thermally-assisted magnetic recording head used in the practical and comparative examples.

As shown in FIG. 11a, in the thermally-assisted magnetic recording head used in the practical example, the length $L_{MP}$ of the main magnetic pole 92 was 2 μm, the distance between the main magnetic pole 92 and a back contact portion 94 was 6 μm, and the length $L_{BC}$ (in X-axis direction) of the back contact portion 94 was 2.5 μm. A portion of the main magnetic pole 92 was embedded in a groove in the surface plasmon generator 91. The distance $D_{ME}$ between the portion of the main magnetic pole 92 that is not embedded and the propagation edge 910 (vertex NFP) was 120 nm. The distance $D_{WN}$ between the vertex NFP that is the NF-light emission point and the vertex WFP that is the write-field generating point was 50 nm. As shown in FIG. 11c, the length $L_{UY}$ (in X-axis direction) of the upper yoke layer was 12 μm, and the width $W_{UY}$ in the track width direction (Y-axis direction) was 17 μm. The back contact portion 94 consisted of two sections and a waveguide 90 passed through between them with a gap $D_{BW}$ of 2 μm on each side. A write coil layer 95 (FIGS. 11a and 11c) was formed as a helical coil disposed in such a way as to sandwich the upper yoke layer therebetween.

On the other hand, as shown in FIG. 11b, the thermally-assisted magnetic recording head used in the comparative example had the same configuration and dimensions as the head shown in FIGS. 11a and 11c except that the main magnetic pole 98 of the head in the comparative example was not embedded in the surface plasmon generator 97 but was spaced apart from the generator 97. The distance $D_{ME}$ between the edge 980 of the main magnetic pole 98 that was the write-field generating portion and NFP (propagation edge 970) was 120 nm, which was the same as the distance $D_{ME}$ in the practical example in FIG. 11a.

Figure 12:
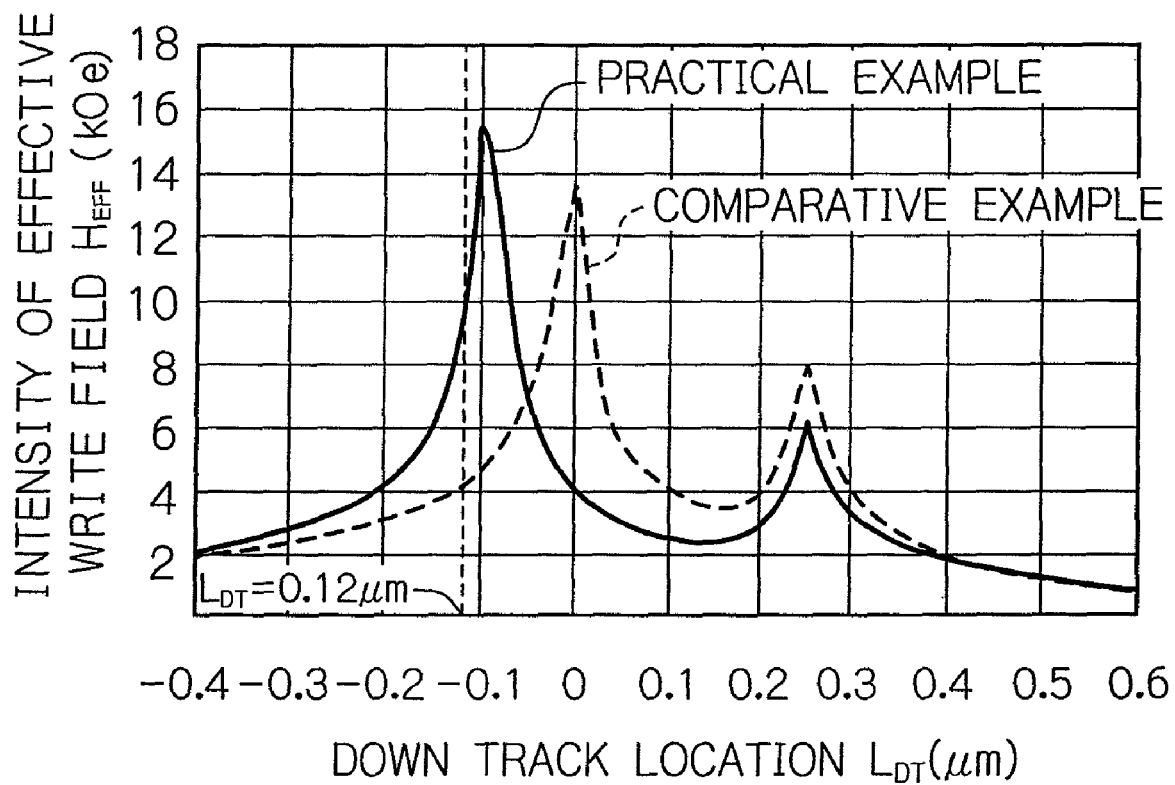
FIG. 12 shows a graph illustrating intensity distributions of effective write fields in the practical example and the comparative example.

FIG. 12 shows a graph illustrating intensity distributions of effective write fields in the practical example and the comparative example. The horizontal axis of the graph in the figure represents location $L_{DT}$ on the head part end surface 2210 along the track (in Z-axis direction). That is, the effective write field intensities are the values obtained on the head part end surface 2210. The origin of the locations in the practical example is at the leading-side end of the portion of the main magnetic pole 92 that is not embedded. The origin of the locations in the comparative example is at the edge 980 of the main magnetic pole 98. The positive direction is the down track direction (+Z direction), that is, the direction heading toward the trailing side. Further, the effective write field is defined as a write field generated from the main magnetic pole that effectively acts on the recording layer to reverse magnetization of the recording layer thereby to form a recording pit. In practice, the effective write field $H_{EFF}$ depends on three write field components $H_P$, $H_T$ and $H_L$ as $H_{EFF}=((H_P^2+H_T^2)^{1/3}+H_L^{2/3})^{3/2}$. Here, $H_P$ is a write field component in the direction perpendicular to the surface of the magnetic recording layer, $H_L$ is a write field component in the track width direction, and $H_T$ is a write filed component in the direction along the track.

As shown in FIG. 12, the peak corresponding to the magnetic field from the trailing edge of the main magnetic pole appears around location $L_{DT}=0.25$ μm in both of the practical and comparative examples. This peak, which is not necessary for writing, is higher in the comparative example than the practical example. On the other hand, the effective write field intensity peak at the leading edge of the main magnetic pole, which relates to writing, is over 15 kOe (Oersteds) in the practical example, which is greater than the peak of approximately 14 kOe in the comparative example.

Further, the effective write field intensity $H_{EFF}$ in location $L_{DT}=-0.12$ μm, which corresponds to the vertex NFP, that is, the NF-light emission point, is 8.986 kOe in the practical example, which is greater than twice the value in the comparative example of 4.119 kOe. This shows that a sufficiently intense write field can be generated at the NF-light emission point by embedding a portion of the main magnetic pole 92 in the surface plasmon generator 91 and thereby a magnetic recording head better suited for thermally-assisted magnetic recording than ever can be provided.

As described above, it is understood that a thermally-assisted magnetic recording head is provided, in which the NF-light emission point can be provided sufficiently close to the write-field generating portion thereby appropriately heating a portion to be written on the magnetic recording medium. Thus, satisfactory thermal-assisted magnetic recording can be achieved, which contributes to the achievement of higher recording density, for example, exceeding 1 Tbits/in$^2$.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thermally-assisted magnetic recording head comprising:
    a magnetic pole for generating write field from its end on an opposed-to-medium surface side;
    a waveguide through which a light for exciting surface plasmon propagates; and
    a near-field light generator provided between the magnetic pole and the waveguide, configured to be coupled with the light in a surface plasmon mode and to emit near-field light from a near-field light generating end surface that forms a portion of the opposed-to-medium surface,
    the near-field light generator comprising a propagation edge extending to the near-field light generating end surface and being configured to propagate thereon the surface plasmon excited by the light, at least a portion of the propagation edge being opposed to the waveguide with a predetermined distance, and
    the magnetic pole having a direct surface contact with a surface portion of the near-field light generator that does not include the propagation edge.

2. The thermally-assisted magnetic recording head as claimed in claim 1, wherein the magnetic pole has a surface contact with all side surfaces of the near-field light generator that do not have the propagation edge as one of their boundaries.

3. The thermally-assisted magnetic recording head as claimed in claim 1, wherein the magnetic pole covers or one end surface of the magnetic pole overlaps all side edges of the near-field light generator except the propagation edge.

4. The thermally-assisted magnetic recording head as claimed in claim 1, wherein the near-field light generator comprises a groove extending to the near-field light generating end surface on a side opposite to the propagation edge, and a portion of the magnetic pole is embedded in the groove.

5. The thermally-assisted magnetic recording head as claimed in claim 4, wherein the groove is substantially V-shaped.

6. The thermally-assisted magnetic recording head as claimed in claim 4, wherein a bottom of the groove is located at a distance along a track from the propagation edge, and a distance on the opposed-to-medium surface between the bottom of the groove and the propagation edge is 30 nanometers or more, and 100 nanometers or less.

7. The thermally-assisted magnetic recording head as claimed in claim 1, wherein a magnetic shield is provided on a side opposite to the magnetic pole when viewed from the near-field light generator.

8. The thermally-assisted magnetic recording head as claimed in claim 1, wherein a buffering portion having a refractive index lower than that of the waveguide is provided in a region including a sandwiched portion between the waveguide and the propagation edge.

9. The thermally-assisted magnetic recording head as claimed in claim 1, wherein the near-field light generator is formed of a silver alloy including at least one element selected from a group consisting of a palladium, gold, copper, ruthenium, rhodium and iridium.

10. A head gimbal assembly comprising: a thermally-assisted magnetic recording head as claimed in claim 1; and a suspension supporting the thermally-assisted magnetic recording head.

11. A magnetic recording apparatus comprising:
    at least one head gimbal assembly comprising: a thermally-assisted magnetic recording head; and a suspension supporting the thermally-assisted magnetic recording head;
    at least one magnetic recording medium; and
    a recording circuit configured to control write operations that the thermally-assisted magnetic recording head performs to the at least one magnetic recording medium, the thermally-assisted magnetic recording head comprising:
    a magnetic pole for generating write field from its end on an opposed-to-medium surface side;
    a waveguide through which a light for exciting surface plasmon propagates; and
    a near-field light generator provided between the magnetic pole and the waveguide, configured to be coupled with the light in a surface plasmon mode and to emit near-field light from a near-field light generating end surface that forms a portion of the opposed-to-medium surface,
    the near-field light generator comprising a propagation edge extending to the near-field light generating end surface and being configured to propagate thereon the surface plasmon excited by the light, at least a portion of the propagation edge being opposed to the waveguide with a predetermined distance,
    the magnetic pole having a direct surface contact with a surface portion of the near-field light generator that does not include the propagation edge, and
    the recording circuit further comprising a light-emission control circuit configured to control operations of a light source that generates the light for exciting surface plasmon.

12. The magnetic recording apparatus as claimed in claim 11, wherein the magnetic pole has a surface contact with all side surfaces of the near-field light generator that do not have the propagation edge as one of their boundaries.

13. The magnetic recording apparatus as claimed in claim 11, wherein the magnetic pole covers or one end surface of the magnetic pole overlaps all side edges of the near-field light generator except the propagation edge.

14. The magnetic recording apparatus as claimed in claim 11, wherein the near-field light generator comprises a groove extending to the near-field light generating end surface on a side opposite to the propagation edge, and a portion of the magnetic pole is embedded in the groove.

15. The magnetic recording apparatus as claimed in claim 14, wherein the groove is substantially V-shaped.

16. The magnetic recording apparatus as claimed in claim 14, wherein a bottom of the groove is located at a distance along a track from the propagation edge, and a distance on the opposed-to-medium surface between the bottom of the groove and the propagation edge is 30 nanometers or more, and 100 nanometers or less.

17. The magnetic recording apparatus as claimed in claim 11, wherein a magnetic shield is provided on a side opposite to the magnetic pole when viewed from the near-field light generator.

18. The magnetic recording apparatus as claimed in claim 11, wherein a buffering portion having a refractive index lower than that of the waveguide is provided in a region including a sandwiched portion between the waveguide and the propagation edge.

19. The magnetic recording apparatus as claimed in claim 11, wherein the near-field light generator is formed of a silver alloy including at least one element selected from a group consisting of a palladium, gold, copper, ruthenium, rhodium and iridium.

20. The thermally-assisted magnetic recording head as claimed in claim 1, wherein an end surface of the waveguide on the opposed-to-medium surface side lies behind the opposed-to-medium surface of the head when viewed from outside of the head on the opposed-to-medium surface side.

* * * * *